United States Patent [19]

Scheuneman et al.

[11] Patent Number: 4,697,233
[45] Date of Patent: Sep. 29, 1987

[54] PARTIAL DUPLICATION OF PIPELINED STACK WITH DATA INTEGRITY CHECKING

[75] Inventors: James H. Scheuneman, St. Paul; Joseph H. Meyer, Lake Elmo; Donald W. Mackenthun, Fridley, all of Minn.

[73] Assignee: Unisys Corporation, New York, N.Y.

[21] Appl. No.: 595,864

[22] Filed: Apr. 2, 1984

[51] Int. Cl.[4] .................... G06F 11/08; G06F 11/16; G06F 12/00
[52] U.S. Cl. .................................. 364/200; 371/68; 371/24
[58] Field of Search ... 364/200 MS File, 900 MS File; 371/21, 49, 67, 68, 24, 16

[56] References Cited

U.S. PATENT DOCUMENTS

| | | | |
|---|---|---|---|
| 4,138,732 | 2/1979 | Suzuki et al. | 364/900 |
| 4,258,418 | 3/1981 | Heath | 364/200 |
| 4,370,746 | 1/1983 | Jones et al. | 371/21 |
| 4,450,538 | 5/1984 | Shirasaka | 365/219 |
| 4,456,976 | 6/1984 | Savage | 364/900 |
| 4,559,626 | 12/1985 | Brown | 371/21 |

FOREIGN PATENT DOCUMENTS 54-22739  2/1979  Japan .................................. 371/48

Primary Examiner—Archie E. Williams, Jr.
Assistant Examiner—Thomas C. Lee
Attorney, Agent, or Firm—Charles A. Johnson; Lawrence J. Marhoefer

[57] ABSTRACT

An improved partially duplicated stack structure for ensuring data integrity through a pipelined stack is described. An improved virtual first-in first-out stack structure having a plurality of parallel stacks, each for storing predetermined segments of data signals from a total data word is described in conjunction with one or more associated compare stack structures which are commonly accessed during loading and reading the stack. The compare stack is arranged for storing predetermined selected bit groupings associated with each of the segments of data signals. The bit groupings from the compare stack are compared with like-situated bit groupings from the associated segments of data signals at readout. Failure of the bit-by-bit comparison results in an indication that a stack address decode error has occurred, thereby providing through-checking of the integrity of the functioning of the stack structures.

9 Claims, 25 Drawing Figures

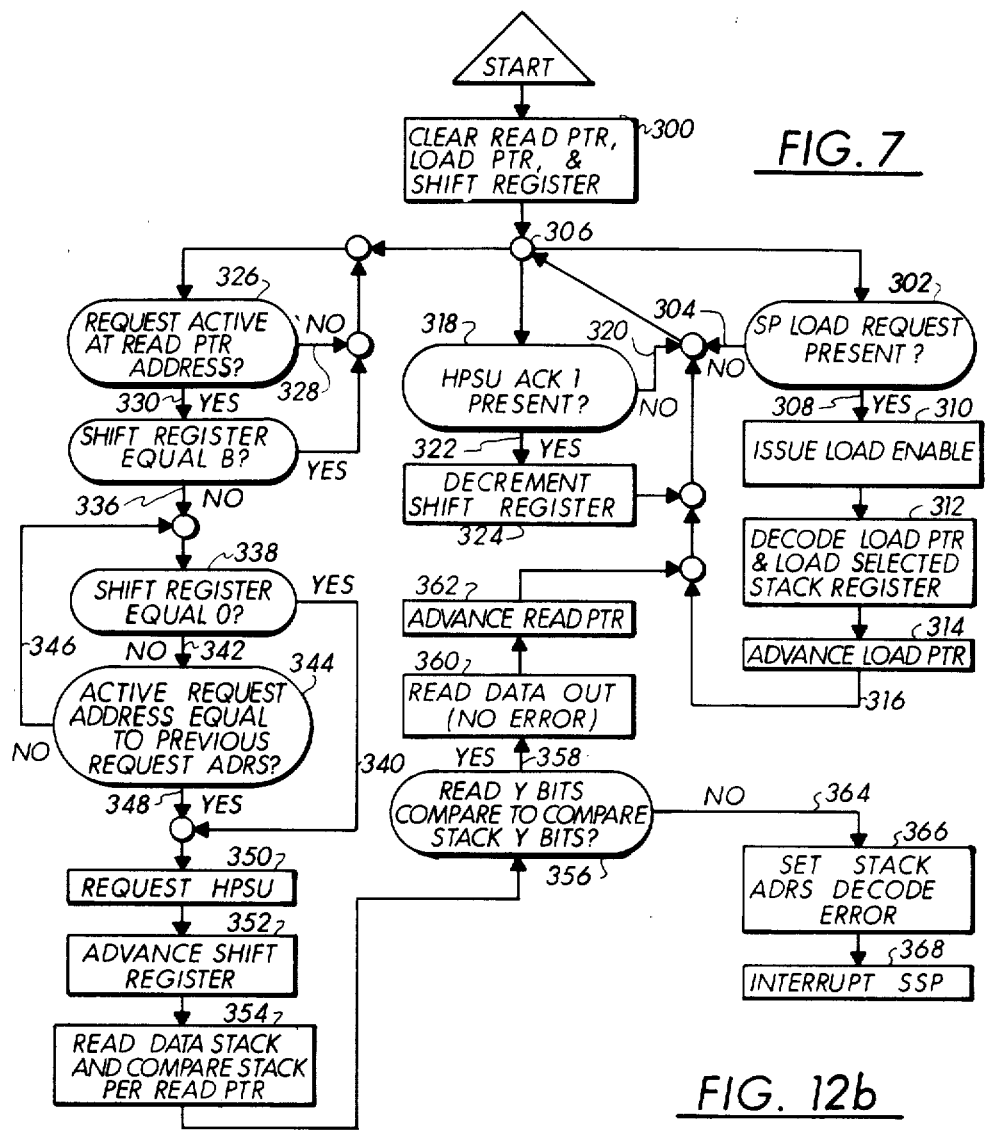

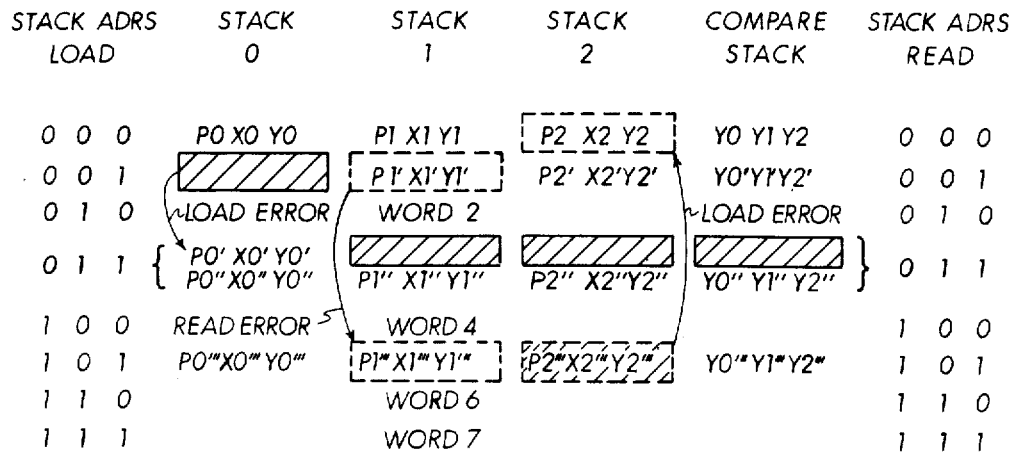
FIG. 8b
DECODER TRUTH TABLE
| INPUT | | | | OUTPUT | | | | | | | |
|---|---|---|---|---|---|---|---|---|---|---|---|
| H | EN | $2^2$ | $2^1$ | $2^0$ | 0 | 1 | 2 | 3 | 4 | 5 | 6 | 7 |
| H | L | L | L | L | L | H | H | H | H | H | H | H |
| H | L | L | L | H | H | L | H | H | H | H | H | H |
| H | L | L | H | L | H | H | L | H | H | H | H | H |
| H | L | L | H | H | H | H | H | L | H | H | H | H |
| H | L | H | L | L | H | H | H | H | L | H | H | H |
| H | L | H | L | H | H | H | H | H | H | L | H | H |
| H | L | H | H | L | H | H | H | H | H | H | L | H |
| H | L | H | H | H | H | H | H | H | H | H | H | L |
FIG. 12c
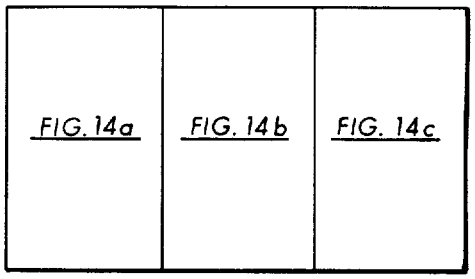
FIG. 14

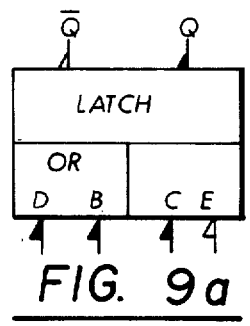
FIG. 9a
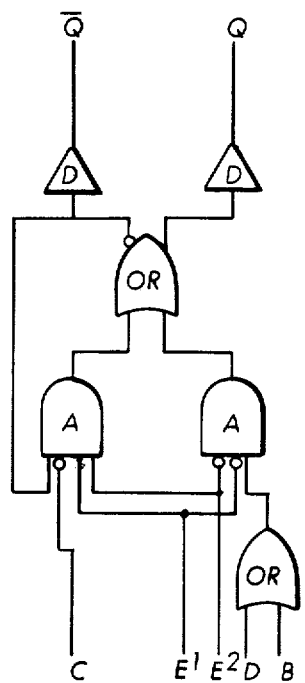
FIG. 9c
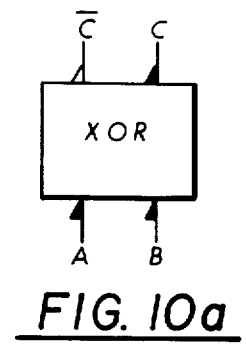
FIG. 10a
FIG. 9b
FIG. 10b
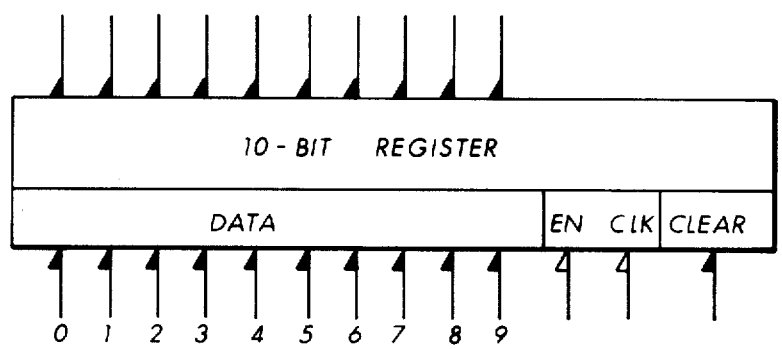
FIG. 11

PARTIAL DUPLICATION OF PIPELINED STACK WITH DATA INTEGRITY CHECKING

CONTENTS

Related Patent Applications
Contents
Background of the Invention
  A. Field of the Invention
  B. State of the Prior Art
Objects
Summary of the Invention
Brief Description of the Drawings
Description of the Preferred Embodiment
  A. Conventions
  B. The System
  C. High Performance Storage Unit
  D. Multiple Unit Adapter
  E. Scientific Processor
  F. Partially Duplexed Pipelined Stack System
  G. Stack Address Decode Error Sequence
  H. Sequence Timing and Error Examples
  I. Building Blocks
  J. Detailed Logic
Claims

RELATED PATENT APPLICATIONS

The following co-pending patent applications are assigned to the assignee of this invention, and their teachings are incorporated herein by reference:

Title: HIGH PERFORMANCE STORAGE UNIT
  Inventor: James H. Scheuneman
  Ser. No.: 596,130, now U.S. Pat. No. 4,633,434.
  Filed: Apr. 2, 1984.

Title: MULTIPLE UNIT ADAPTER
  Inventor: James H. Scheuneman
  Ser. No.: 596,205
  Filed: Apr. 2, 1984.

BACKGROUND OF THE INVENTION

A. Field of the Invention

This invention relates to the field of digital data processing systems wherein one or more host data processors utilize one or more supporting scientific processors in conjunction with storage systems that are commonly accessible. More particularly it relates to an improved multiple unit adapter for use in such a digital data processing system. Still more particularly it relates to an improvement of an improved pipelined stack that is partially duplexed to provide through-checking for enhanced data integrity through a multiple unit adapter.

B. State of the Prior Art

Digital data processing systems are known wherein one or more independently operable data processors function with one or more commonly accessible main storage systems. Systems are also known that utilize a support processor with its associated dedicated supporting, or secondary storage system. Such support processors are often configured to perform specialized scientific computations and are commonly under task assignment control of one of the independently operable data processors. The controlling data processor is commonly referred to as a "host processor". The host processor characteristically functions to cause a task to be assigned to the support processors; to cause required instructions and data to be transferred to the secondary storage system; to cause the task execution to be initiated; and to respond to signals indicating the task has been completed, so that results can be transferred to the selected main storage systems. It is also the duty of the host processor to recognize and accommodate conflicts in usage and timing that might be detected to exist. Commonly, the host processor is free to perform other data processing matters while the support processor is performing its assigned tasks. It is also common for the host processor to respond to intermediate needs of the support processor, such as providing additional data if required, responding to detected fault conditions and the like.

In the past, support scientific data processors have been associated with host data processing systems. One such prior art scientific processor is disclosed in U.S. Pat. No. 4,101,960, entitled "Scientific Processor" and assigned to Burroughs Corporation, of Detroit, Mich. In that system, a single instruction multiple data processor, which is particularly suited for scientific applications, includes a high level language programmable front-end processor; a parallel task processor with an array memory; a large high speed secondary storage system having a multiplicity of high speed input/output channels commonly coupled to the front-end processor and to the array memory; and an over-all control unit. In operation of that system, an entire task is transferred from the front-end processor to the secondary storage system whereupon the task is thereafter executed on the parallel task processor under the supervision of the control unit, thereby freeing the front-end processor to perform general purpose input/output operations and other tasks. Upon parallel task completion, the complete results are transferred back to the front-end processor from the secondary storage system.

It is believed readily seen that the front-end processor used in this earlier system is a large general purpose data processing system which has its own primary storage system. It is from this primary storage system that the entire task is transferred to the secondary storage system. Further, it is believed to be apparent that an input/output path exists to and from the secondary storage system from this front-end processor. Since task transfers involve the use of the input/output path of the front-end processor, it is this input/output path and the transfer of data thereon between the primary and secondary storage systems which becomes the limiting link between the systems. Such a limitation is not unique to the Scientific Processor as disclosed in U.S. Pat. No. 4,101,960. Rather, this input/output path and the transfers of data are generally considered to be the bottleneck in many such earlier known systems.

The present scientific data processing system is considered to overcome the data transfer bottleneck by providing an unique system architecture using a high speed memory unit which is commonly accessible by the host processor and the scientific processor. Further, when multiple high speed storage units are required, a multiple unit adapter is coupled between a plurality of high speed memory units and the scientific processor.

Data processing systems are becoming more and more complex. With the advent of integrated circuit fabrication technology, the cost per gate of logic elements is greatly reduced and the number of gates utilized is everincreasing. A primary goal in architectural design is to improve the through-put of problem solutions. Such architectures often utilize a plurality of processing units in cooperation with one or more multiple port memory systems, whereby portions of the same problem solution may be parcelled out to different processors or different problems may be in the process of solution simultaneously.

When a Scientific Processor (SP) is utilized to perform supporting scientific calculations in support of a host processor(s), and is utilized in conjunction with two or more High Performance Storage Units (HPSU's), the problem of timing of access of the SP to any selected HPSU for either reading or writing causes problems of access coordination. In order to coordinate and provide the required control, the over-all system is arbitrarily bounded to require that the SP issue no more than a predetermined number of Requests for access without the receipt back of an Acknowledge. In one configuration, the system is bounded by requiring that no more than eight such Requests be issued by the SP without receipt of an Acknowledge. The details of the interface and control of a Multiple Unit Adapter for transmitting data to and from a designated HPSU by the SP is described in detail in the co-pending application entitled "Multiple Unit Adapter". There it is pointed out that the interface to the HPSU's must also provide for and accommodate different requesters that may be associated therewith. While the data processing system is essentially synchronous, that is operations are under clock control in their execution, the occurrence of Requests, the availability of responding units, and the occurrence of Acknowledge signals are asynchronous with respect to each other. The details of operation of the HPSU's are set forth in detail in the co-pending application entitled "High Performance Storage Unit".

The prior art has recognized the advantageous operation of utilizing buffers to match transmissions between two operating systems that have different operational rates. As so-called pipelined architectures were developed to improve the rates of through put, the concept of buffering was extended to the development of intermediate stack structures for temporarily storing or holding data items pending availability of the destination unit. Early versions of stacks of this type involved a first-in first-out (FIFO) structural arrangement with control that would cause Requests and data to be shifted through the stack shift registers such that the first Request and its associated data would be processed first and then on in order as they occurred. This type of shift register stack requires the control to cause shifting through the registers as Acknowledges are received, together with control to determine when the stack is full and no more Requests can be received. Shifting stacks are relatively slow, consume unnecessary power, and require an undue amount of circuitry to implement.

The problems with shift register stacks have been addressed and various configurations of virtual FIFO stacks have been developed. In virtual FIFO stacks data words are stored in registers controlled by loading identifiers. The data words once stored remain in the associated stack register until accessed for readout, and do not shift from register to register. Instead, the shifting of readout is directed and controlled by readout control signals. In operation, then, when data is to be loaded or written in the stack, the Load Pointer (Load PTR) is advanced for each write operation. Similarly, for each read operation the Read Pointer (Read PTR) is advanced. When appropriately controlled, the Pointers sequence circularly through the stack registers at all times providing a FIFO function. By thus controlling the Pointers, it is unnecessary to shift the data from stack register to stack register. When no data is stored in the stack, the two Pointer would reference the same stack register address. The difference between the Load PTR and Read PTR indicates the number of words in the buffer stack. When the Pointers are binary numbers the difference is a numerical count.

It is of course apparent that since the virtual FIFO stack is functionally circular, external control must be exercised in applying Requests to read and write to avoid over-writing. Accordingly, such virtual stacks are also normally bounded to accommodate a predetermined number of load Requests that can occur without having received an Acknowledge that results from reading out a register from the stack.

Virtual FIFO stacks are described in the identified co-pending applications, and have been described in technical literature.

Various other types of virtual stack structures have been described, for example where a virtual FIFO buffer can accommodate variable numbers of data words, and where synchronization is dynamically adjusted depending upon the rate of transfer through the FIFO buffer. An example of the latter type of FIFO buffer is described in U.S. Pat. No. 4,288,860, entitled "Dynamic Storage Synchronizer Using Variable Oscillator" issued to John R. Trost and assigned to the assignee of the subject invention.

In fabrication it is common for the stack registers to be fabricated in segments such that the conceptual single stack of registers is in reality a plurality of parallel stacks where each stack stores a predetermined segment of the data word. Characteristically, it is common to provide multiple parallel stacks segmented on the basis of bytes of data, where a byte is normally defined to include a divisible subset of an entire data word. When thus configured, and however accessible, it is required that the loading or reading be decoded for each of the parallel stacks such that all segments of a word to be accessed are uniformly identified. It has become clear that decoding of the access control signals can be the subject of error conditions. Such errors can occur when specific segments of a particular word in the parallel stacks are incorrectly decoded such that access in one or more of the stacks is incorrectly accessed to reform a total data word. Normally each segment of the data word will have a parity bit associated therewith, but when one or more segments are incorrectly accessed due to decoding errors, the parity check for each segment will presumably check correctly and will not indicate that the resultant word is in fact made up of a combination of segments that is incorrect. In this context "data word" means actual data signals together with appropriate associated signals such as required to provide address and function control. It is of course apparent that the segments may be equal in the number of bits utilized, but also may differ in the number of bits.

OBJECTS

It is a primary of object of this invention to provide an improved digital data processing system wherein one or more host data processors utilize one or more supporting scientific processors in conjunction with storage systems that are commonly accessible.

Another primary object of the invention is to provide an improved Multiple Unit Adapter for use in a data processing system.

It is a further primary object of the invention to provide an improved stack structure.

It is another object of the invention to provide an improved stack structure having through-checking to provide enhanced data integrity.

Yet another object of the invention is to provide an improved stack structure that is partially duplexed for through-checking stack operation.

Another object of the invention is to provide an improved stack structure utilizing a plurality of parallel stacks each for storing predetermined segments of data signals, together with a compare stack commonly accessed during loading and reading for storing predetermined selected bit groupings associated with each of the segments, and available for comparison at readout with like-situated bit groupings for use in checking accuracy of access to the stack structure.

Still another object of the invention is to provide a partially duplexed stack structure that is economical to construct and operate.

Still another object of the invention is to provide an improved duplexed stack structure for providing through-checking of accuracy of stack access that imposes minimal time overhead in passing data through the stack structure.

Still another object of the invention is to provide an improved partially duplexed stack structure having a plurality of parallel stacks for storing predetermined bit groupings in addressable locations and a compare stack storing predetermined bit groupings from each segment of bits in like-addressable locations and having comparison circuitry for comparing stored bit groupings in the compare stack to like-situated bit groupings in the stack registers and having comparison error signal circuitry for providing error signals when comparison between associated bit groupings is not found to exist.

It is a further primary object of the invention to provide an improved first-in first-out (FIFO) stack structure.

It is another object of the invention to provide an improved FIFO stack structure having through-checking to provide enhanced data integrity.

Yet another object of the invention is to provide an improved virtual FIFO stack structure that is partially duplexed for through-checking stack operation.

Another object of the invention is to provide an improved virtual FIFO stack structure utilizing a plurality of parallel stacks each for storing predetermined segments of data signals, together with a compare stack commonly accessed during loading and reading for storing predetermined selected bit groupings associated with each of the segments, and available for comparison at readout with like-situated bit groupings for use in checking accuracy of access to the stacks structure.

Still another object of the invention is to provide an improved partially duplexed virtual FIFO stack structure having a plurality of parallel stacks for storing predetermined bit groupings in addressable locations and a compare stack storing predetermined bit groupings from each segment of bits in like-addressable locations and having comparison circuitry for comparing stored bit groupings in the compare stack to like-situated bit groupings in the stack registers and having comparison error signal circuitry for providing error signals when comparison between associated bit groupings is not found to exist.

SUMMARY OF TME INVENTION

The digital data processing system includes one or more host processors each coupled to one or more high performance storage units. Host processors can be selected from units available commercially, where the 1100/90 system available from Sperry Corporation is found to be particularly advantageous.

The High Performance Storage Unit (HPSU) is unique, and is basically a memory unit capable of coupling to various pluralities of instruction processors, and input/output units as well as to a pair of Scientific Processor (Sp). Since each HPSU is directly connected to the input/output units and the instruction processors of the host system, it is an inherent part of the host data processing system. On the other hand, since it is also directly connected to the Scientific Processor, it is also its main storage system. Because of its novel properties, it is able to interface both with the host system and the Scientific Processor without the resulting "bottleneck" of past scientific data processing systems.

When more than one HPSU is desired to provide additional storage capacity, a Multiple Unit Adapter (MUA) is utilized between each Scientific Processor and multiple High Performance Storage Units Generally, the MUA is an interface unit which couples a single Scientific Processor through the use of a single Scientific Processor port to a plurality of up to four HPSUs via four HPSU ports. In this manner a Scientific Processors may address, read and write any location in any of the HPSUs.

The MUA is used in a scientific data processing system to interface at least one Scientific Processor to a plurality of High Performance Storage Units. The use of a separate MUA in such a data processing system enables the Scientific Processor of such a system to have a single HPSU port to thereby reduce the cost of the Scientific Processor when a single HPSU is desired to be used in the system. This MUA is required only when more than one HPSU is used in the scientific data processing system, thereby providing the additional memory interfaces needed for the Scientific Processor.

The Scientific Processor (SP) used herein is a special purpose processor attached to the host system via the HPSU(s). It is optimized for high speed execution of floating-point vector arithmetic operations. The SP provides increased performance for both integer and floating-point scalar operations that are embedded in the vectorized code to thereby provide overall increased-performance for scientific vector FORTRAN programs.

The invention includes a Multiple Unit Adapter that incorporates a first-in first-out pipelined stack structure for providing temporary storage of words to be transferred from a supporting Scientific Processor (SP) to a selected designated High Performance Storage Unit pending avail ability of access to the selected HPSU. The stack structure is partially duplexed such that a predetermined number of bits of each data word are stored in a compare stack. At readout the bits stored in the compare stack are available for comparison to bits stored in the stack registers for determining that decoding of access to the stack registers have properly occurred, thereby through-checking the stack operation for ensuring data integrity of data in the pipeline.

The invention provides an improved stack structure utilizing a plurality of parallel stacks each for storing predetermined segments of data signals from a total data word, in conjunction with at least one compare stack commonly accessed during loading and reading, where the compare stack stores predetermined selected bit groupings associated with each of the segments. The through-checking circuitry functions at readout from the stack to compare on a bit-by-bit basis, selected bits from the data word with like-situated bit groupings from the compare stack for checking accuracy of decoding of the access signals for the stack structure.

In a virtual first-in, first-out stack structure, a Load Pointer is utilized to access the next register in the stack at which entry should be made, and utilizes a Read Pointer to designate the stack register from which transmission to the High Performance Storage Unit should be made. Through use of the compare stack in conjunction with the pipelined stack, and addressable by the same Load Pointers and the Read Pointers, the comparison circuitry can compare like-situated bit groupings at readout for determining that decoding of the Load Pointer and Read Pointer has properly occurred. If comparison according to predetermined criteria is not found to exist for any comparison operation, an error signal is issued and the data processing system is notified that the stack structure has malfunctioned, thereby limiting the storage of corrupted data in the High Performance Storage Unit.

The invention comprises the structure of the partially duplexed stack structure incorporating the compare stack and comparison circuitry for through-checking the integrity of the decoding of Load Pointers and Read Pointers, and the method of through-checking pipelined stack structure operation.

BRIEF DESCRIPTION OF THE DRAWINGS

FIG. 7 is a sequence diagram illustrating the through-checking function in the partially duplexed stack utilized in the Multiple Unit Adapter;

FIG. 8b illustrates types of errors that can occur in a pipelined virtual first-in first-out stack as a result of decoding errors occurring either during loading or reading operations;

FIG. 9a is a logic block diagram for a Latch, that will provide true output Q and complement output $\bar{Q}$;

FIG. 9b is a Truth Table for the functioning of the Latch illustrated in FIG. 9a;

FIG. 9c is a logic element drawing of the Latch illustrated in FIG. 9a, and illustrates the logical elements and interconnections to accomplish the Latch functions;

FIG. 10a is the logic block diagram symbol for the two-input Exclusive-OR (XOR);

FIG. 10b is the Truth Table for the Exclusive-OR illustrated in FIG. 10a;

FIG. 11 is a logic block diagram symbol for a 10-bit Register;

FIG. 12b is a table illustrating the selected stack register in response to Pointer input signals for the three-to-eight decoder illustrated in FIG. 12a;

FIG. 12c is a Decoder Truth Table for the decoder illustrated in FIG. 12a;

FIG. 13b is a table illustrating count output signals for the counter illustrated in FIG. 13a;

DETAILED DESCRIPTION OF THE PREFERRED EMBODIMENT

A. Conventions

Figure 1:
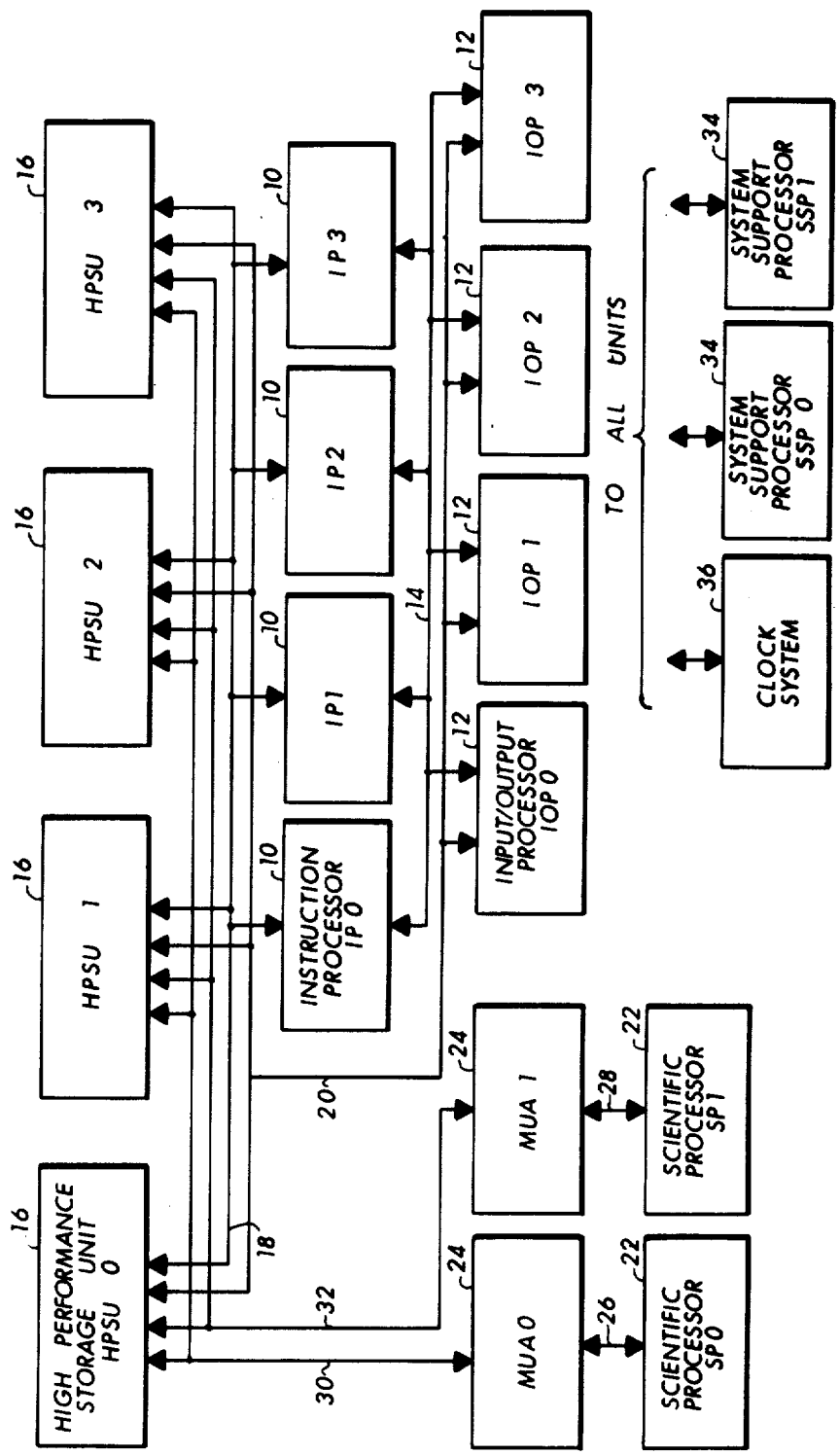
FIG. 1 is a system block diagram of the over-all digital data processing system in which the invention can be utilized.

Throughout the following description and in the accompanying drawings there are certain conventions employed which are familiar to those that are skilled in the art to which this invention pertains. Within the application, reference numerals will be affixed to elements and items discussed. To the extent possible, elements that are referenced in different figures within the application will bear the same reference numeral. It will be understood that elements may be described or mentioned in others of the identified co-pending applications, but will not necessarily bear the same numeral reference between applications.

The signal lines, control lines, and cables are accorded unique descriptive names which will remain invariant to the extent possible at all points of usage and reference within the application. Signal lines generally enter at the bottom of a Figure and exit at the top, resulting in a general flow from bottom to top. Signals and signal lines which enter or exit the logic circuit of a Figure all together from outside the circuit are accorded descriptive symbolism in order that they may be clearly recognized.

Block diagrams will be utilized to describe the interrelationship of identified functional units. Interconnecting lines between functional units can represent a single wire conductor, a group of parallel conductors, or a general path of data for control flow. In block diagrams the arrowhead will indicate the direction of signal flow for the particular data or control signals identified. Where appropriate, emphasis for particular lines may be added to indicate specific paths, for example through the use of heavy lines; through addition of numerals indicative of the number of conductors or parallel signal paths involved, or by indication of unique function. Within block diagrams specific logical symbols for well known components such as adders, selecters, registers, multiplexers, and the like may be utilized without further explanation of the specific elements, since such elements are so well known in the art that they require no additional explanation.

For purposes of discussion of specific logic block diagrams or functional logic circuits, it is convenient to have a reference of signal levels For many it is desirable to relate logical "1" and logical "0" to signal levels. In general, a logical "1" will be the equivalent of a High signal, and a logical "0" will be the equivalent of a Low signal, but it should be clearly understood that as given input signals pass through networks of logic circuits that the relationship of logical "1" and logical "0" as they relate to numerical values will not directly relate. Accordingly, the clearest understanding of logic block diagrams and functional logic circuits will be most clearly understood from a consideration of the High and Low signal interrelationships. It is of course understood that these representations of signal levels are illustrative and relate to a rendition of the preferred embodiment, but that alternative signal level representations can be used without departing from the scope of the invention.

In more detailed logic block diagrams, block symbols will be utilized to represent various functions. For the lower order logical functions such as AND, designated A; OR; Inversion designated I, and the like, the designations within the block symbols of the respective functions is readily understandable to those skilled in the art. More complex macro logical functions, for example multiple input Exclusive-OR designated XOR, may not be readily apparent from the block symbol, and in such cases the macro function will be further defined through functional logic diagrams or truth tables or a combination thereof.

As a further aid in understanding the logic block diagram representations, a system of arrowhead representation at the input and output of the block symbols will assist in defining the function of the associated logic element. In this regard, the combination of signals represented at the input of a logic element in combination with the designation of the logical function will define the signal level or levels at the output of the logic element. At the input, a closed half-arrowhead represents a response to a High signal and an open half-arrowhead indicates that the response is to a Low signal. Accordingly, if an AND circuit (A) is represented having two or more closed half-arrowheads at the input, it will indicate that the AND function is on High signals and will be satisfied only when all input lines receive High signals. In a similar manner, if an A symbol is illustrated having two or more open-arrowhead inputs, the function designated is that of Low AND, and will be satisfied only when all inputs are Low. It is apparent that this Low AND function is logically equivalent of an High OR function. In a similar fashion, the half-arrowhead convention is applied to define output relationships.

In physical construction of circuits to implement the designated logic functions, it is not uncommon to provide signal inversion in conjunction with the combinatorial logic function. In such cases, the fact of inversion will be designated by the state of the half-arrowhead on the output line or lines. In this way, it will be understood that a Low AND circuit having two or more open half-arrowhead inputs will provide a Low output signal at the open half-arrowhead output terminal only when all input signals are Low. If the Low AND circuit has a closed half-arrowhead at its output, it is understood that inversion takes place within the logic block element, and the High output signal will be derived only when all input signals are low. It is also common for circuits implemented through integration techniques to provide an output signal and the complement of the output signal on separate lines. This representation in the logic block diagram symbol will result in an open half-arrowhead and a closed half-arrowhead at the output of the block. Generally speaking the right-most half-arrowhead in the symbolic representation will be considered as the true output and will define the function of the element, and the left-most half-arrowhead will be considered as the complement thereof. For example, an A symbol having two or more closed half-arrowhead inputs and a right-most closed half-arrowhead would normally indicate an AND function of High signals resulting in a High output signal at the closed half-arrowhead only when all input signals are High. If this same symbol utilizes an open half-arrowhead at the left, a Low output signal will be derived at that point when all input signals are High. It is not deemed necessary to illustrate specific circuits to accomplish the basic logic functions since various types of electronic circuits can be utilized and are well known to those skilled in the art.

In the event detailed logical circuit diagrams of macro symbols are illustrated, the symbol having a straight bottom and rounded top, sometimes referred to as the "bullet" symbol, represents the logical AND function and the symbol having a curve at the input and the curve pointed output, often referred to as the "shield" symbol, represents circuits that perform the logical OR function. For the AND function the straight line input or the dot, represents a High AND, and results in a High output signal when all input signals are High. The open circles adjacent the input terminals indicate that the circuit responds to Low signals. The straight line output is equivalent to the closed half-arrowhead representation described above, and the circle output designation is equivalent to the open half-arrowhead representation. This type of symbol is well known in the art and need not be described further.

B. The System

FIG. 1 is a system block diagram of the over-all digital data processing system in which the invention can be utilized. The over-all system is essentially moduler, and provides for parallel processing.

For the configuration illustrated, from one to four Instruction Processors IP0 through IP3, each labelled 10, can be utilized. Each IP can for example be a Type 3054-00 unit available from Sperry Corporation, or such other Instruction Processor available commercially as would be compatiable. The IP provides basic mode and extended mode instruction execution, virtual machine capability, and contains two buffer memories (not shown), one an operand buffer, and the other an instruction buffer. Each IP is functional to call instructions from memory, execute the instructions, and in general does data manipulation. The IP also executes instructions to set up input and output data buffers and channel access control.

In conjunction with the IPs, from one to four Input-/Output Processors IOP0 through IOP3, labelled 12, can be utilized. The interconnections between the IPs and the IOPs, collectively labelled 14, are in fact direct connections between each unit, and the interconnection is not bused. Each IOP can be a Type 3067-00 unit available from Sperry Corporation, or an equivalent type of processor. The IOPs handle all communications between the IPs and the memory systems, and the peripheral subsystems (not shown). In this type of configuration, the IPs function as the system Central Processing Units, and the IOPs act as CPUs to handle all of the communications. The IPs and IOPs are commonly referred to as the 1100/90 system.

From one to four High Performance Storage Units HPSU0 through HPSU3, each labelled 16, can be utilized in the system. Each HPSU is a free-standing unit with eight memory Banks, each Bank containing 524K words. Each HPSU provides four Instruction Processor (IP) ports for providing communication paths to the IPs, both for reading and writing, shown collectively as interconnection paths 18. Again it should be understood that interconnection between each HPSU and each IP is directly cabled, and is not bused. Each HPSU also includes four Input/Output Processor (IOP) ports for interconnection with the IOPs. These interconnections are shown collectively as interconnections 20 and are direct cables between each HPSU and each IOP. The IP and the IOP ports are each two-word read and write interfaces, where each word contains 36 data bits and four parity bits. Each HPSU also includes at least one Scientific Processor (SP) port, and in the embodiment shown has two such SP ports. Each SP port has a four-word data interface. The IOP and the IP interfaces operate on a 60 nanosecond clook oyole and the SP interface operates on a 30 nanosecond clock cycle. The HPSU is a novel memory system and is described in one or more of the above identified copending incorporated patent applications.

Error Correction Code (ECC) is used internal to each HPSU to provide single-bit error correction and double-bit error detection.

In the embodiment illustrated one or two Scientific processors Sp0 and Sp1, labelled 22, can be utilized. If a single SP is used with a single HPSU, it may be coupled directly to the SP port of such HPSU. When two or more HPSUs are used with an SP, it is necessary to provide a Multiple Unit Adapter (MUA) for each SP. In this configuration MUA0 and MUA1, each labelled 24, are coupled to SP0 and SP1, respectively, across interface lines 26 and 28. MUA0 is coupled to each HPSU through interconnection paths 30, and MUA1 is coupled to each HPSU through interconnection path 32.

Each SP functions under direction of one or more of the IPs to perform scientific type calculations in a support mode. In this regard, the IPs can be considered to be host processors and the SPs can be considered to be support processors, all operating through common storage.

The over-all system maintenance and supervision is accomplished through one or two System Support Processors SSP0 and SSP1, each labelled 34, which are connected to all units of the system. The SSP is available commercially and is utilized in the Sperry Corporation 1100/90 Systems. In general, it is understood that each SSP performs the function of a hardware maintenance panel for the system. The display and setting of information, the activation of most maintenance facilities, selecting modes of operation and the like, is done at the control section of the SSP.

A Clock System 36 is utilized to maintain synchronous operation of the entire system. Clock and synchronizing signals are sent to each IP as will as each HPSU, each IOP, and each Sp The clock interface includes signals and commands from the IP for controlling clock rates, clock mode, cycle count, and other capabilities of the clock. The clock system is novel, and is described in one of the above identified copending patent applications.

Intercommunication between units is essentially on a Request and Acknowledge basis, and the interfaces will be described in more detail as appropriate.

C. High Performance Storage Unit (HPSU)

Figure 2:
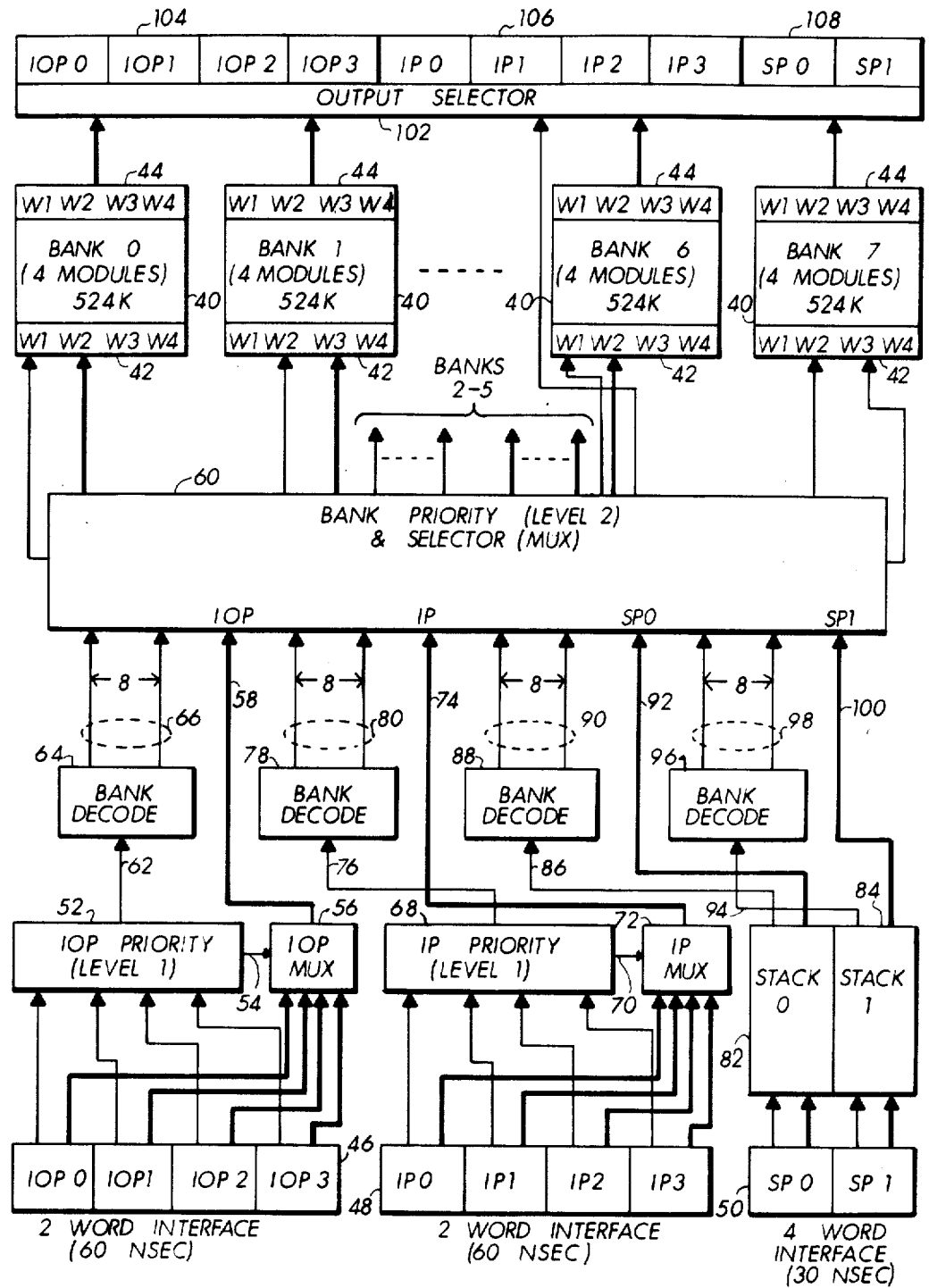
FIG. 2 is a simplified functional blocked diagram of the High Performance Storage Unit.

FIG. 2 is a simplified functional blocked diagram of the High Performance Storage Unit.

The HPSU is a storage device that is commonly accessable by the IPs, the IOPs, and the SPs via the MUAs. The various devices that can be coupled to the HPSU can have differing interface systems and operational rates In the preferred embodiment, the HPSU utilizes eight Banks of storage devices, generally identified as Bank 0 through Bank 7 of which Banks 0, 1, 6, and 7, are illustrated, and each labelled 40 since they are essentially similar. Though not specifically illustrated, each Bank is comprised of four Memory Modules and each Bank has a total capacity of 524K words. A word in memory is 44-bits, of which 36-bits are data bits and the remaining eight bits are utilized for Error Correction Code (ECC) check bits and parity bits. Each Bank 40 is arranged for receiving four words W1, W2, W3, and W4, labelled 42 for writing, and four such words labelled 44 when read out.

The memory Banks 40 include the addressing circuitry, the storage cells, the timing circuits, and the driver circuits, and can be constructed from commercially available components, it being understood that the accessing rate must accommodate the interface rates with the attached units.

The heavy lines indicate directions of data flow, and the signle lines indicate control flow.

At the input, the HPSU has an IOP interface 46 which can accommodate up to four IOP units, at the four IOP ports labelled IOP0 through IOP3. It also has an IP interface 48 which can accommodate up to four IPs at the four IP ports designated IPO through IP3. The IOP ports 46 and the IP ports 48 each operate on a two-word interface at a clock rate of 60 nanoseconds.

The HPSU also has an input SP interface 50 which can accommodate two Sps at the two ports labelled Sp0 and Sp1. The SP ports each function with a four-word simultaneous interface and operate at a clock rate of 30 nanoseconds.

The request and control signals from the IOP ports 46 are passed to the IOP Priority 52, which functions to select the particular IOP to be given priority of access to the memory system. The selection is passed on line 54 to the IOP MUX 56 which functions to select the appropriate data and address information to pass on line 58 to the Bank Priority and Selector (MUX) 60. The control signals provided on control path 62 drive the Bank Decode 64 for selecting one-of-eight control lines 66 for providing control signals for making Bank selection.

In a similar manner, the IP ports 48 provide control signals to the IP Priority 68, which provides control signals on control line 70 to the IP MUX 72 for selecting the data and address signals that will be provided on path 74. Similarly, the control signals on line 76 to the Bank Decode 78 results in signals being provided to select one of eight lines 80 for controlling Bank selection.

The two Sp ports 50 are each arranged to store requests in Stack 0 labelled 82. and in Stack 1 labelled 84. SP requests and data are temporarily held in Stack 0 and Stack 1 awaiting availability of the memory system. In essence, Stack 0 and Stack 1 are each a first-in first-out (FIFO) circulating buffer. The request information feeds out of Stack 0 on line 86 to the Back Decode 88 which provides a one-of eight selction and data passes on line 92 to the Bank Priority Selector 60. Similarly, request information passes on line 94 to the Bank Decode 96 for making selctions on lines 98, while the data passes on line 100.

The Bank Priority and Selector functions to select between the IOP, IP, and the two SP requests presented to it for accessing memory. It also functions to control the Output Selector 102 when reading is to take place The HPSU has an IOp output 104 capable of handling four IOP ports IOP0 through IOP3. It also has an IP output 106 capable of handling four IP ports labelled IP0 through IP3. Finally, it has an Sp output 108 capable of handling two SP output ports labelled SP0 and SP1. Data rates and timing at the output ports 104, 106 and 108 are similar to those for the input ports previously described.

D. Multiple Unit Adapter (MUA)

Figure 3:
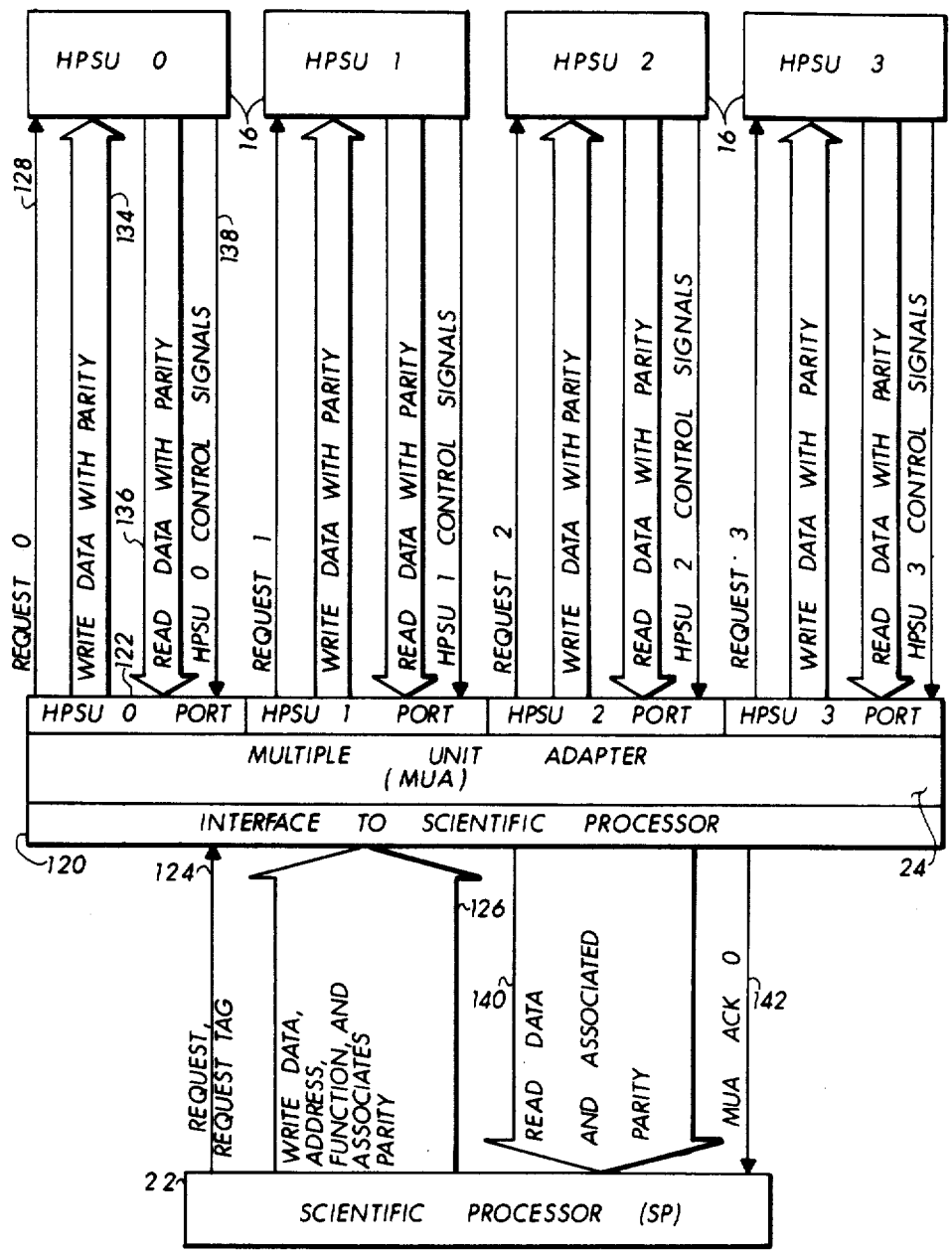
FIG. 3 is a simplified blocked diagram of the Multiple Unit Adapter (MUA) for providing selective interconnection of a Scientific Processor to one of up to four High Performance Storage Units.

FIG. 3 is a simplified blocked diagram of the Multiple Unit Adapter (MUA) for providing selctive interconnection of a Scientific Processor to one of up to four High Performance Storage Units.

The MUA 24 has an Interface to Scientific Processor 120 and up to four HPSU ports 122, each adapted for interconnection to an associated HPSU 16.

A Scientific processor (SP) issues Request signals on control path 124 to the MUA. For a write operation, the write data, address, function, and associated parity is provided via cable 126. The MUA can accumulate up to eight request from the SP without acknowledgement, and the requests and the associated data are stored in a first-in first-out (FIFO) stack (not shown).

For purposes of example, if it is assumed that the SP has designated HPSU0, and the request is determined by the MUA to be the next request to be processed, a Request 0 will be provided on control path 128 to HPSU0. Recalling that this will be only one of several requests that can be provided to HPSU0, it will be honored when its priority is selected. If the function is write, the write data with parity will be provided on cable 134. If the function is to read, the read data with parity will be passed from HPSU0 on cable 136 to the MUA. Upon completion of the requested function, the HPSU0 control signals will pass via control path 138 to the MUA. When the MUA establishes that the current request is a read, the read data and associated parity will pass on cable 140 to the SP. As each request is passed on to the selected HPSU, an MUA Acknowledge 0 (ACK 0) nal will be passed on control path 142 to the SP, thereby indicating that the stack has room for one more request.

When the MUA has passed eight requests to an HPSU without acknowledgement the MUA ceases requesting until an Acknowledge 1 (ACK 1) control signal is received in control cable 138.

The control and data path lines for HPSU1, HPSU2, and HPSU3, would function in a similar manner. When the SP reqests access to a different HPSU, all outstanding requests to the first HPSU must be serviced prior to the MUA processing requests to a different HPSU.

All data and control signals from the SP with the exception of a few special control signals, are passed on to the HPSU, and all data and control signals from the HPSU are passed on to the SP. The SP data word is four 36-bit words wide. Along with the data field, an address field of 22-bits and a function field of 6-bits are sent with the request. Odd parity is provided for every 9-bits of data, making the SP data word transmission a total of 160-bits, the address field a total of 25-bits, and the function code field a total of 7-bits.

E. Scientific Processor (SP)

Figure 4:
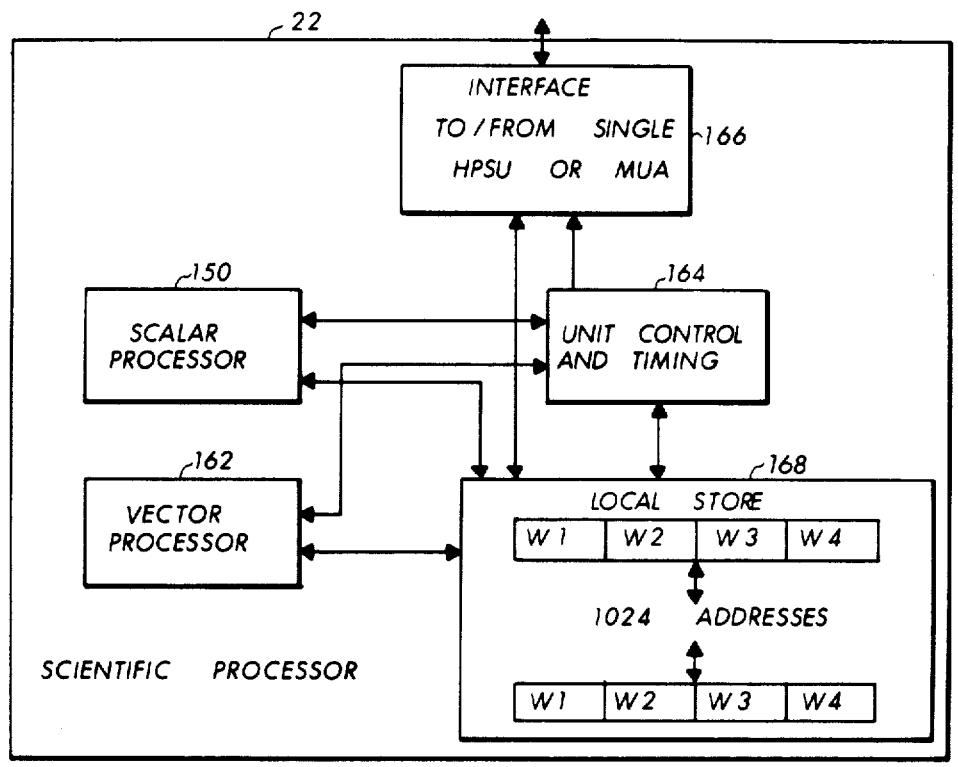
FIG. 4 is a simplified blocked diagram of the Scientific Processor.

FIG. 4 is a simplified blocked diagram of the Scientific processor.

Basically, the SP 22 is a subsystem defined as an attached processor of the host system. The SP has been optimized for the high speed execution of floating-point vector arithmetic operations. It is intended to execute user code only and is not intended to run an executive program. It does not require a control program nor does it have any privileged modes of operation. The SP includes distinct modules, the Scalar Processor 150, the Vector Processor 162, the Unit Control Timing 164, the Interface 166, and the Local Store 168.

The Vector Processor module 162 performs vector calculations. The Scalar Processor module 150 performs scalar operations, and also has the over-all control function, including instruction fetch and issue. Generally speaking, the Scalar and Vector processor modules operate in parallel although some Scientific Processor instructions require both modules to execute.

The Local Store 168 in the perferred embodiment comprises a high speed random-access memory (RAM) 4,096 words. The arrangement is such that four words W1 through W4 are accessed simultaneously, yielding an addressable range of 1,024 addresses. The Local Store 168 is used primarily for the storage of frequently used scalar variables, and it should be noted is distiguished from the relatively large dedicated memory sections in prior art support processors, the minimal storage being rendered sufficient through the coupling to the plurality of HPSUs.

The general system environment and background described with regard to FIG. 1 through FIG. 4 is set forth to indicate the complexity of the data processing system in which the subject invention may be utilized.

F. Partially Duplexed Pipelined Stack System

The invention has particular application to the MUA, but may be applied in any environment in which a pipelined stack is utilized, and in general provides through-checking of the decoding of the loading and readinq control signals. In the following descriptions, the frame of reference will be the MUA, it being understood that the partially duplexed pipeline stack is in the data flow path from the SP to a designated HPSU. It will be understood that there are various control, addressing, and data paths between the SP and the HPSU that are under pipelined control of the MUA. These signal lines and control functions are described in the above identified co-pending applications, and are not set forth in detail here, since they do not add appreciably to an understanding of the invention.

Figure 5:
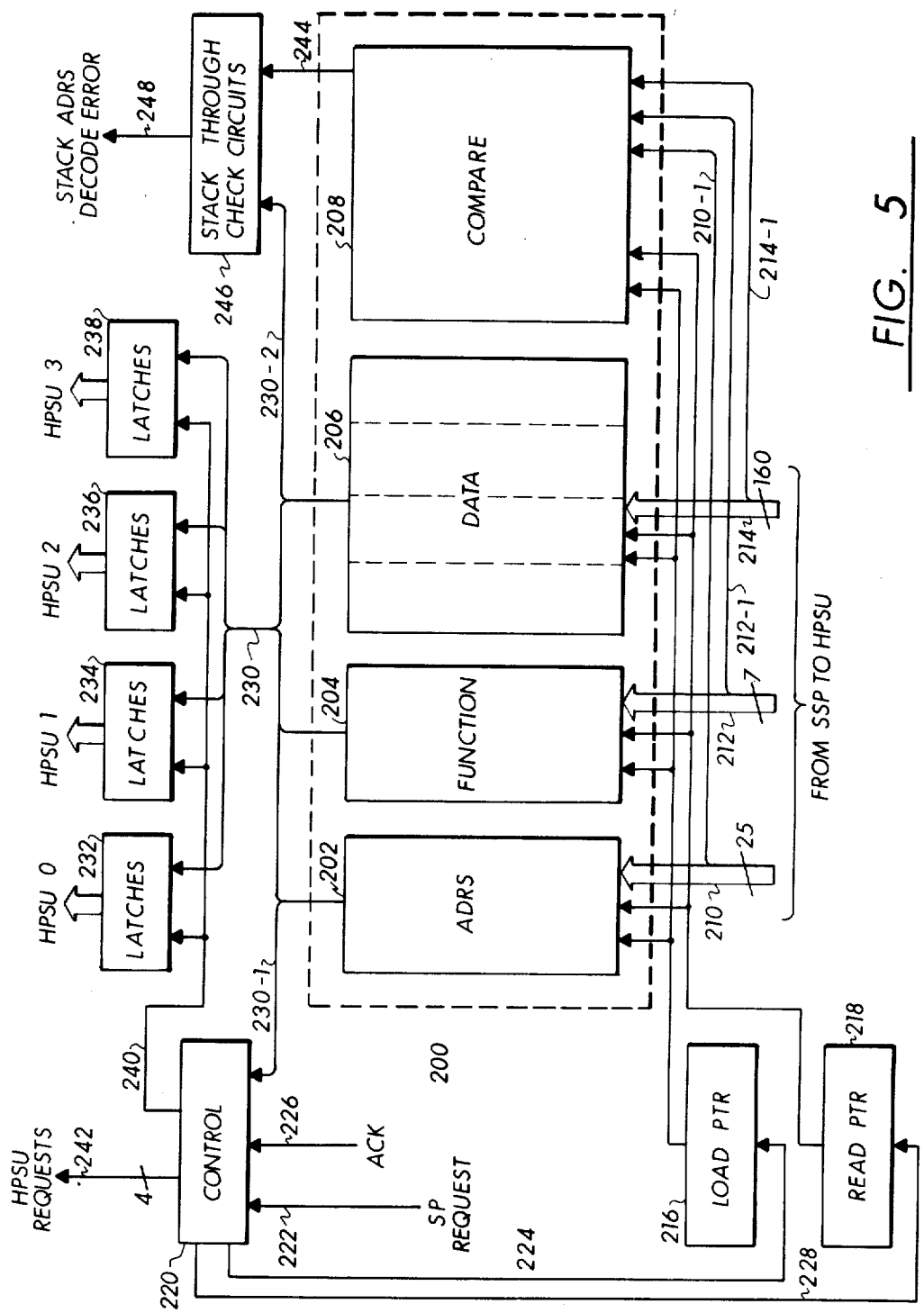
FIG. 5 is a simplified block diagram of the partially duplexed stack in the Multiple Unit Adapter utilized in transmitting from the Scientific Processor to the Hioh Performance Storage Units.

FIG. 5 is a simplified block diagram of the partially duplexed stack in the Multiple Unit Adapter utilized in transmitting from the Scientific Processor to the High Performance Storage Units. In this illustration the pipelined Stack is shown enclosed within dashed block 200.

The Stack 200 is comprised of four functionally separate stack portions, with Address information being stored in ADRS portion 202; the Function information stored in FUNCTION portion 204; the Data being stored in the DATA portion 206, and Compare information in the COMPARE portion 208. As previously indicated, the pipelined partially duplexed Stack of the subject invention finds particular utility in the transfer of data and information from the SP to a selected HPSU, and provides enhanced data integrity in this pipelined data stream. In this regard, address information is provided on cable 210 to ADRS stack 202; the Function information is provided on cable 212 to the FUNCTION stack 204; and the Data is provided on cable 214 to the DATA stack 206. The slash numerical designations through the cables indicate the number of parallel conductors in the transmission path. At the same time as Address, Function, and Data signals are received for recording in the stack 200, selected bits from each will simultaneously be applied to the COMPARE stack 208 on line 210-1, 212-1, and 214-1. The bit selections will be described in more detail below.

In this configuration, the Stack 200 is comprised of eight addressable register locations, and is fabricated in intergrated circuit gate arrays. The addressing for loading the Stack 200 is provided from a Load Painter (Load PTR) 216, and functions to provide a binary selection signals simultaneously to all portions of Stack 200. Similarly, to read from Stack 200, a Read Pointer (Read PTR) 218 provides binary selection signals simultaneously to all portions of Stack 200.

In the internal structure of Stack 200 (not shown in detail) the Load PTR and the Read PTR must be decoded based upon physical partitioning to provide access to the portions of the addressable register associated therein. In essence, Stack 200 is comprised of a plurality of parallel stack structures where each stack structure is utlized for addressably storing predetermined segments of the total data and control information that is to flow from the SP to the selected HPSU.

The Control 220 functionally responds to an SP Request on line 222 to issue a control signal on line 224 to advance the Load PTR 216. As has previously been described generally, the total pipelined system is bounded, and in a preferred embodiment is arranged to permit the receipt of up to eight SP Requests without receipt of an Acknowledge. Accordingly, in the preferred embodiment the Stack 200 has eight addressable register locations, and the Load PTR 216 is a 3-bit binary counter that is capable of generating binary address numbers for addressing up to eight addressable locations. It will be understood that each signal issued on line 224 causes the Load PTR 216 to advance one count. When the count passes through eight, it is circular and returns to the first address. In the actual addressing generation, addresses are identified as binary 000 through binary 111 indicating a range of 0 through 7 (eight) total address representations.

In addition to being pipelined for loading the Stack 200, the Control 220 also provides pipelined output from the Stack. When Control 220 determines that an SP Request has been loaded, it issues HPSU Request on line 242, that are pipelined. The function is described in more detail in the co-pending application entitled "Multiple Unit Adapter" identified above, but in general, a bi-directional shift register (not shown) is used to determine the number of HPSU Request issued without receiving back an HPSU ACK 1 signal on 226 indicative that a Request has been handled. The Shift Register advances one position for each HPSU Request and reverses one position for each ACK 1 signal received. The Shift Register boundary conditions are continuously monitored. When the Shift Register indicates that eight Requests have been issued without receiving an ACK 1 back from the HPSU, it is determined that output pipelining must be held up, and further HPSU Requests will be inhibited unitl the next ACK 1 signal is received. A received ACK 1 signal will cause the Shift Register to shift back and a further HPSU Request can be issued. The shift Register can be constructed with type MC 10141 units available from Motorola Corporation.

When Control 220 issues an HPSU Request siqnal on line 242, it issues an advances signal on line 228 to the Read Pointer 218. The Read Pointer 218 functions to gate the selected address from Stack 200 out on lines 230 to Latches 232 for HPSU 0, Latches 234 for HPSU 1, Latches 236 for HPSU 2, and Latches 238 for HPSU 3. At the same time, the Address signals pass on line 230-1 to Control 220 which functions to issue selection signals on line 240 to select which of Latches 232, 234, 236, or 238 will actually receive the data for transmission to the select HPSU. At the same time, Control 220 will issue signals on control path 242 to select an HPSU Request to the appropriate HPSU.

Functionally, then, it will be understood that initially the Load PTR and the Read PTR will be set to an initial condition, for example referencing the first address in Stack 200. When data is received from the SP at Stack 200, it will be loaded in the first address position and the SP request will cause the Load Pointer to be advanced, thereby indicating that the next received word should be stored in the second address position. Since the Read Pointer still references the first position, the information from the first stack position will be loaded in the selected one of Latches 232, 234, 236, or 238. When an HPSU Request is issued, the Shift Register is advanced and the Read Pointer 218 will be advanced and the next address register in Stack 200 will be loaded in the selected one of the set of Latches. In this manner, the Stack 200 results in operation as a virtual FIFO stack, it being understood that the control for prohibiting overwriting is accomplished external to the pipelined stack.

At readout, the same bit configurations that were stored in the COMPARE Stack 208 are accessed and read out on line 230-2 and on line 244 to the Stack Through Check Circuits 246 where they are compared. As will be described in more detail below, if comparison is not found, it indicates that an error has occurred in the decoding of the Load PTR or the Read PTR, and a STACK ADRS DECODE ERROR signal will issue on line 248.

Figure 6:
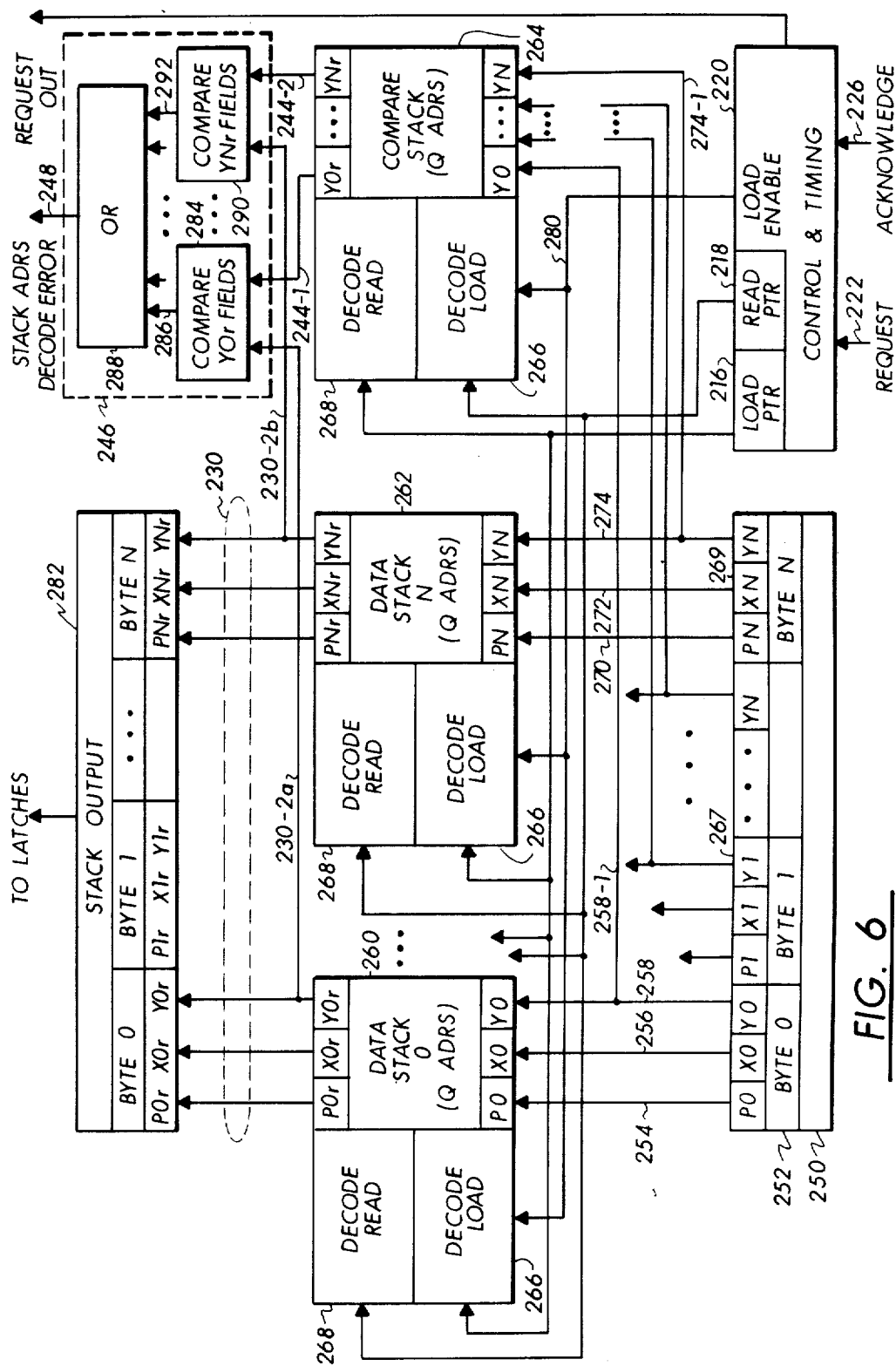
FIG. 6 is a more detailed block diagram of the partially duplexed stack including a compare stack with bit comparison for accessed stack registers to determine whether or not stack address decode errors have occurred.

FIG. 6 is a more detailed block diagram of the partially duplexed Stack including a Compare Stack with bit comparison for accessed stack registers to determine whether or not stack address decode errors have occurred. In this configuration the Stack Input 250 receives all bits that are to be passed through the pipeline of the MUA. The bits to be written can be considered in segments which may or may not be equal in the number of bits per segment. Considering bytes of 9-bits with associated parity bits, it will be understood that each byte of bits will be associated with a portion of the Stack. For example, considering Byte 0 252, it will understood to be comprised of parity bit P0 issued on line 254, a grouping of bits X0 issued on lines 256, and a grouping of bits Y0 issued on lines 258. All of the bits from Byte 0 are stored in Data Stack 0 260 at an address specified by the Load PTR 216. In general, the Stack includes Data Stack 0 260 through Data Stack N 262, and Compare Stack 264. Each of these portions of the Stack are arranged to have R Addresses (R ADRS).

Each Stack portion 260, 262, and 264 includes a Decode Load circuit 266 which responds to the Load PTR and selects the register address within the Stack at which loading will take place. Similarly, each Stack portion includes a Decode Read circuit 268 that responds to the Read PTR for selecting the Stack register address to be read out.

In a manner similar to that described for Data Stack 0 260, each byte in the Stack Input 250 drives its associated Stack (not shown) to the Byte N 269, which provides its parity bit PN on line 270, a predetermined grouping of bits XN on lines 272, and another grouping of its bits YN on lines 274 to Data Stack N 262. It should be understood that the bit groupings for each byte can be the same or different, and that the bit groupings for X0 through XN can be the same or different, and that the bit groupings for Y0 through YN can be the same or different. In the configuration described, the bit groupings Y0 through YN will be assumed to be equal for each byte, and will be equal to three bits.

At the same time as the data bits are loaded in the Data Stacks 260 through 262, the Y bit groupings for each byte will simultaneously be stored in Compare Stack 264. In this regard, bits Y0 will pass on line 258-1 and YN will pass on lines 274-1 to Compare Stack 264. These bit groupings will be stored at the same stack address specified by the Load PTR, and storage will be under control of the Load Enable provided on line 280 from Control and Timing 220. The advancing of the Load PTR 216 and Read PTR 218 will be in response to the Request and Acknowledge signals as previously described.

In an embodiment having a 9-bit byte together with an associated parity bit, the selection of the Y-bit grouping (where Y is selected to be 3-bits) works out such that the Data Stack physical structure (where N is two) can be identical to the Compare Stack 264 structure. Accordingly, if identical Stack portions are desired from a physical standpoint, it would be necessary to have multiple Compare Stacks for the associated segments of the data associated therewith. However, if physical constraints are not a factor and adequate drive signals are available, the number of Data Stacks (N) can be selected to accommodate the total number of bits to pass through the pipeline in parallel, and the Compare Stack 264 would be of a capacity to handle all bit groupings Y0 through YN.

As previously described, the output from the Data Stacks 260 through 262 pass on lines 230 to the Stack Output 282 for ultimate transmission to the Latches (not shown).

The Stack Through Check Circuit are shown enclosed in dashed block 246. The Compare Y0r Fields circuit 284 receives input signals Y0r on line 230-2a from Data Stack 0 260, and Y0r on line 244-1 from Compare Stack 264. If these two Y0r groupings compare exactly, no error signal is issued on line 286 to OR 288. However, if any of the bit positions do not compare for Y0r, an error signal will issue on line 286 and will pass through OR 288 resulting in a STACK ADRS DECODE ERROR signal on line 248. Simultaneously, Compare YNr Fields circuit 290 receives the YNr bit grouping on line 230-2b from Data Stack N 262 and on line 244-2 from Compare Stack 264. If these YNr Fields compare exactly, no error signal issues on line 292, but if any difference in the bit positions compared are detected, the error signal issues to OR 288. All other Y bit groupings read from the associated Data Stack are compared to like-arranged bit groupings read from the Compare Stack 264, and failure of comparison of any bit position will result in an error signal to OR 288.

G Stack Address Decode Error Sequence

FIG. 7 is a sequence diagram illustrating the through-checking function in the partially duplexed Stack utilized in the Multiple Unit Adapter. At the start of operation, it is necessary to Clear the Load PTR, the Read PTR and the Shift Register per element 300. Thereafter, a test is made to determine if an Sp Load Request is present at decision 302, and if not, the "No" path 304 causes the system to Keep Checking 306, thereby continuing the test to see if the SP Load Request is present. When an SP Load Request is present, the "Yes" path 308 is taken and the Stack is enabled to load a word at the Load PTR ADRS per element 310. Load PTR is decoded and the word is loaded in the elected stack register as indicated by element 312. The Load PTR is advanced at element 314, and the path 316 to Keep Checking 306 is taken.

Concurrently the HPSU Acknowledge (ACK 1) presence is checked at decision element 318; and, if not, the "No" path 320 is taken. When an ACK 1 is present, the "Yes" path 322 is taken and the Shift Register is decremented at element 324.

Simultaneously or concurrently the system checks whether the Request at the Read PTR address is active per decision element 326; and, if not the "No" path 328 is taken to keep checking 306. If the HPSU Request is active, the "Yes" path 330 is taken and the Shift Register is checked to determine if it equals eight, no further requests can be sent to the HPSU until an ACK 1 is received, so "Yes" path 334 is taken to keep checking. If not equal to eight, the "No" path leads to decision element 338, which tests the Shift Register for equality to zero. If equal to zero, the "Yes" path 340 is taken; but if not, the "No" path 342 is taken to decision element 344 where the active request address is tested for equality to the previous request address. If not equal, "No" path 346 is taken; but if equal, "Yes" path 348 is taken, and the Request HPSU 350 is issued. Thereafter the Shift Register is advanced 352. The contents of the Stack Register and the compare Stack Register indicated by Read PTR are read out as indicated by element 354. The Y Bits read out from the Data Stack and from the Compare Stack are compared for equality per decision element 356. If equality is found, the "Yes" path 358 is taken and Read Data is provided to the system, as indicated by element 360, and the Read PTR is advanced 372. If inequality is detected, the "No" path 364 is taken and the STACK ADRS DECODE ERROR signal is set per element 366. Thereafter there is an Interrupt to the SSP 368.

Through the use of the partially duplexed stack structure and the comparison of associated bit groupings this description of the sequences clearly indicates that through-checking through the pipelined virtual FIFO stack can result in errors being detected before the data is passed to the HPSU. Further, it is seen that the indicated error condition can be utilized in directing attention to portions of the system that have likely have been involved in the failure, namely the Read PTR and Load PTR decoding circuitry.

H. Sequence Timing And Error Examples

Figure 8A:
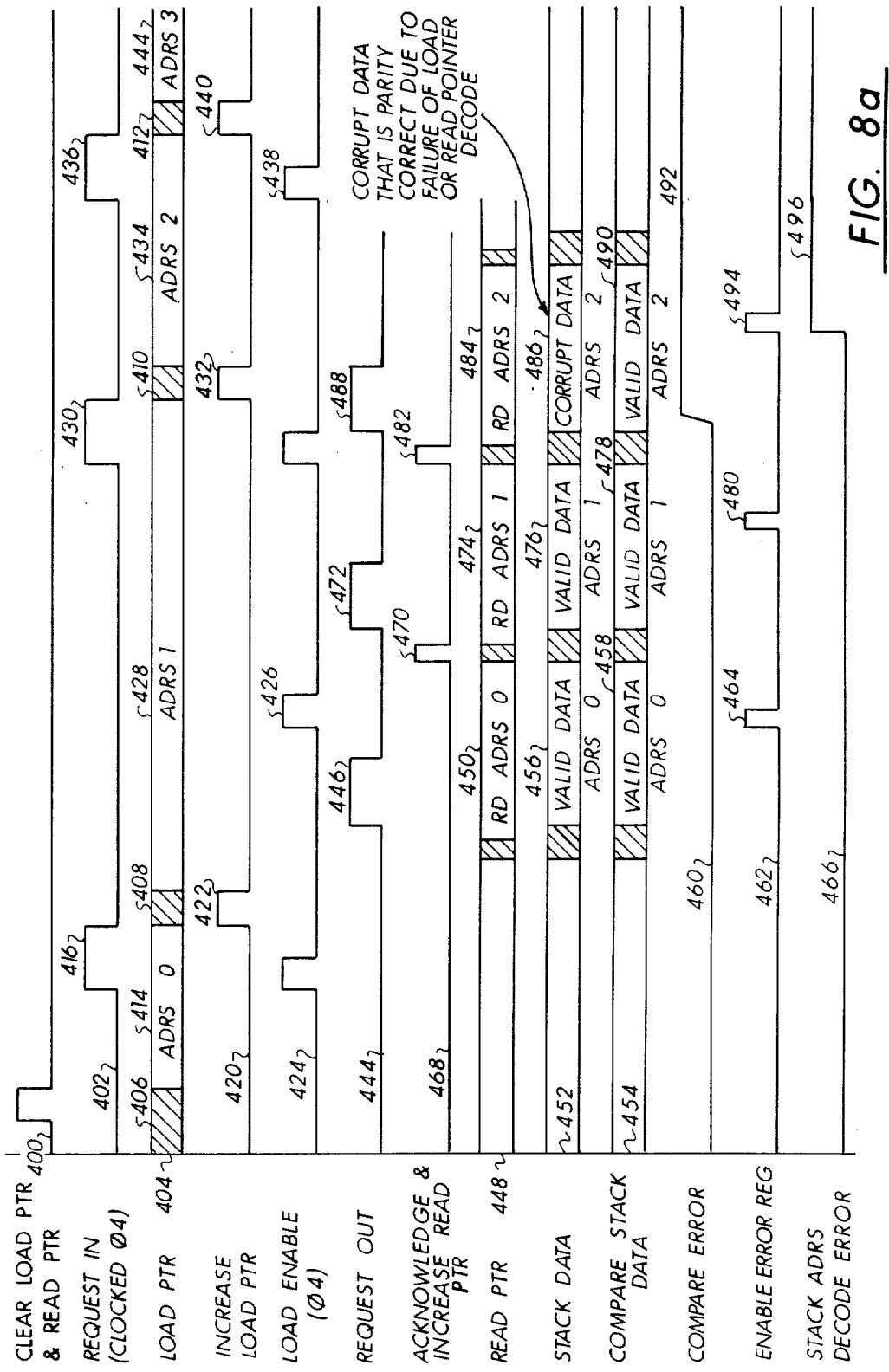
FIG. 8a is a timing diagram that illustrates the sequences described with reference to FIG. 7.

FIG. 8a is a timing diagram that illustrates the sequences described with reference to FIG. 7.

The data processing system is synchronized through Clock System 36 (not shown in detail) which generates a 4-phase set of clock signals designated 01 through 04. It is recognized that various types of clocking arrangements can be utilized, and will be readily apparent to those skilled in the art in constructing the subject invention. When the system is initialized, a Clear Load PTR and Read PTR signal 400 will initialize the Load PTR and Read PTR values to predetermined condition. In the preferred embodiment, the Load PTR 216 and Read PTR 218 will be cleared to binary 0. The Request In is clocked on 04, with an illustrative arrangement shown at waveform 402. The status of Load PTR 404 indicates an undetermined state at times 406, 408, 410, and 412.

When the Load PTR is cleared, ADRS 0 414 will be available. Upon the occurrence of the first Request In 416, the Increase Load PTR 420 is activated at signal time 422. The Load Enable (04) 424 occurs regularly with the occurrence of the 04 timing pulse. Since both the Requests In and the Load Enable are clocked by 04, they occur simultaneously. For purposes of illustration, the Request In corresponding to the second Load Enable 426 is missing. Accordingly, ADRS 1 428 will occur and be present in Load PTR until the occurrence of the second Request In 430. The second Request In 430 results in the Load PTR being increased by signal 432, resulting in the state of the Load PTR being advanced to ADRS 2 434. Upon the occurrence of the third Request In 436 and the Load Enable 438, the contents are stored at ADRS 2, and the Load PTR is increased by signal 440, resulting in the Load PTR indicating ADRS 3 442. The foregoing illustrate the sequencing of the Load PTR in response to Request In signals.

At Request Out 444, the first Request signal 446 causes the Read PTR 448 to Read ADRS 0 450. The Stack Data 452 and the Compare Stack Data 454 will each read Valid Data ADRS 0 at 456 and 458, respectively. If the data is valid, the Compare Error 460 will not indicate any error. Upon the occurrence of the Enable Error Register 462, at pulse 464, there will be no error condition, and the STACK ADRS DECODE ERROR signal 466 will remain in the no-error state. Following the readout, the Acknowledge and Increase Read PTR 468 will provide pulse 470 for causing the Read PTR to advance. Upon the occurrence of the next Request Out 472, the Read PTR will reference Read ADRS 1 474, and valid data will be read from ADRS 1 from the Stack Data 476 and the Compare Stack Data 478. Upon the occurrence of the Enable Error Register signal 480, the condition will still exist that no error has been detected. Upon receipt of Acknowledge signal 482, the Read PTR will be advanced to Read ADRS 2 484. If it is assumed that corrupt data has occured, and the Stack Data is referencing some other address other then ADRS 2, for example ADRS 5 labled 486, the occurrence of the third Request Out signal 488 will cause corrupt data to be compared to the Compare Stack Data 490. This will result in a Compare Error signal 492 being generated. When the Enable Error Register signal 494 is presented, the system will provide the STACK ADRS DECODE ERROR signal 496.

The foregoing examples illustrate the sequences and the control signal utilized, and functionally illustrates the through-checking of the partially duplexed Stack structure.

FIG. 8 illustrates types of errors that can occur in a pipelined virtual first-in first-out stack as a result of decoding errors occurring either during loading or reading operations. In this regard, the Stack ADRS Load column 500 illustrates the sequential binary count for the Load PTR. Similarly, the Stack ADRS Read column 502 illustrates the binary count for the Read PTR. By way of example, the first word is stored or loaded at binary address 000, with Stack 0 storing the bit configurations comprised of P0 X0 Y0, Stack 1 storing the bit configurations for P1 X1 Y1, and Stack 2 storing the bit configurations for P2 X2 Y2. The Compare Stack stores the compare bit configurations Y0 Y1 Y2. As illustrated, everything has been properly decoding during loading, and the Stack Register and the Compare Stack Register stores the appropriate quantities. As previously described, upon the occurrence of the first Request and the storing at address 000, the Load PTR is advanced, and the Stack ADRS Load will reference binary address 001. When the second Request is present, the data should be stored at ADRS 001. If a decode error occurs in Stack 0, the quantity 504 will be indeterminate. If it is assumed that the Load Error 506 is erroneously decoded to reference address 011, the bit grouping P0' X0' Y0' will be stored in an erroneous register in Stack 0. If it is assumed that Stack ADRS Read 001 is then to be read out, the indeterminate quantity 504 will in all probability cause a failure of comparison for Y0'and the decode error will be detected.

When the loading continues to Stack ADRS Load of binary address 011, and assuming proper decoding of the load address, the quantity stored in Stack 0 P0" X0" Y0" will over-write the Load Error quantity, and the quantities P1" X1" Y1" will be stored in Stack 1, the quantities P2" X2" Y2" will be stored in Stack 2, and the Compare Stack will have the proper quantities Y0" Y1" and Y2".

If the Stack ADRS Load to binary address 101 is properly loaded, it will contain the segments illustrated. If a Load Error 508 occurs in Stack 2, and the Load PTR is decoded to indicate address 000 rather then the proper address 101, the quantity P2" X2" Y2" will over-write in address 000 of Stack 2. Under these conditions, the quantity in address 101 labelled 510 will be indeterminate. Whether the load decode-error will be detected at readout of address 000 will depend upon the occurrence of the Request in combination with the occurrence of Acknowledges. If address 000 has already been read out at the time of loading address 101, the decoding error 508 will not be detected until address 101 is attempted to be read out, at which time the likelihood of miscomparison of Y2" will occur.

If it is assumed that address 001 has been properly loaded and that address 101 has been properly loaded, and that a Read Error 512 occurs during readout of address 001 such that address 101 of Stack 1 is improperly read, the read decoding error would likely be detected through failure of comparison of Y1 from the Compare Stack to the Y1''' erroneously read from address 101. The foregoing examples illustrate various sequences of load or read decode errors that can occur and illustrate the functioning of the partial duplex quantities stored in the Compare Stack used in conjunction with similarly situated bits from the associated Stack Registers.

If only one bit per bit grouping is partially duplexed, the probability of detection of the decode error is only 50%. With the use of three bits from each bit grouping, the probability of of detecting a load or read decode error is 87.5% on the first time through the Stack, and 98.4% the second time through the Stack. Accordingly, it can be seen that the apparatus of the instant invention results in a substatial through-checking probability of detecting loading or reading decode errors without substantial time over head, and with minimal amount of additional hardware. If four bits for each bit grouping are partially duplexed, the probability of detecting a decode error is 93.75% the first time through the Stack, and 99.6% the second time through the Stack.

I. Building Blocks

In consideration of the detailed logic diagrams of the subject invention, standard building block elements will be utilized. Elements of this type are available commercially, or can be fabricated by integrated circuit processes that are well-known.

FIG. 9a is a logic block diagram symbol for a Latch, that will provide true output Q and complement output $\bar{Q}$. The combination of Clear C and Enable E signals will depend upon whether the Latch is cleared or enabled for being set. Two data inputs D or B are shown. A High signal on either data line D or B in conjunction with a Low Enable will result in a High output signal being provided at Q and a Low output at $\bar{Q}$. It is understood that if the Latch is to be responsive to only a single input signal, that the other input signal will not be shown.

FIG. 9b is a Truth Table for the functioning of the Latch illustrated in FIG. 9a.

FIG. 9c is a logic element drawing of the Latch illustrated in FIG. 9a, and illustrates the logical elements and interconnections to accomplish the Latch function. This logic element drawing illustrates a circuit that utilizes two Enable signals E1 and E2, both of which must be present to cause the circuit to load. If only a single Enable is desired one can be omitted or led to the Enable level.

FIG. 10a is the logic block diagram symbol for the two-input Exclusive-OR (XOR). The XOR responds to input signals A and B for providing output signal C and signal $\bar{C}$. It functions such that a High input signal on either line A or line B but not both, will result in a High signal at output C and a Low signal at output $\bar{C}$. If both A and B receive Low signals or High signals, the output at C will be Low and the output at $\bar{C}$ will be High, thus it can be used as a single-bit comparitor.

FIG. 10b is the Truth Table for the Exclusive-OR illustrated in FIG. 10a.

FIG. 11 is a logic block diagram symbol for a 10-bit Register. Functionally, the 10-bit register contains 10 1-bit Latches with common Clear and Enable inputs to all functional latches. When the Clear input terminal is driven by a High logic level signal, all 10 Latches are cleared. The Enable (EN) and the Clock (CLK) function as two enable signals. In operation, the CLK line can be driven by the system Clock, or can be driven by other control logic. When the Enable lines are both driven Low, all of the internal Latches will gate their respective data inputs (labelled 0 through 9) to the respectively associated output terminals and hold the levels thus loaded until another Enable condition or Clear condition occurs. If either the Enable or the Clock is driven High, the latches will not be gated. The output signals from the 10-bit Register are shown in the High active state, it being understood that the Low active levels are also present on output terminals not illustrated.

J. Detailed Logic

Figure 12A:
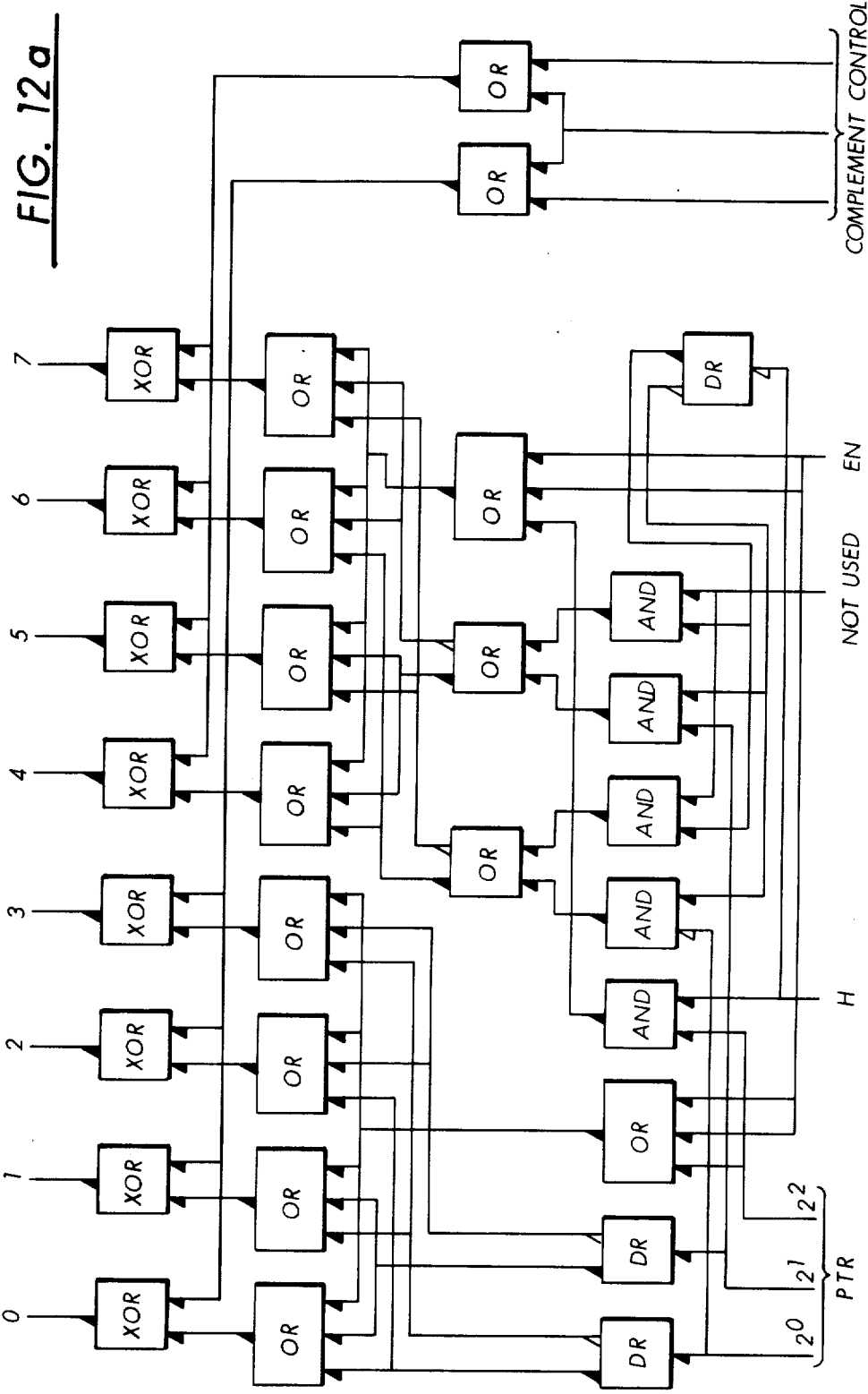
FIG. 12a is a logic block diagram of a three-to-eight decoder.

FIG. 12a is a logic block diagram of a three-to-eight Decoder. Functionally, the Decoder operates to select one and only one of the output terminals labelled 0 through 7 in a High state in response to the 3-bit octal number applied at the PTR input terminals. All output terminals not selected will be in the Low state. For example, if a PTR value of octal 000 is applied, output terminal 0 will be High. In this configuration and explanation, PTR binary 0 values are considered as Low signals and binary 1 signals are considered as High signals. For the embodiment illustrated, the COMPLEMENT CONTROL signals can be held Low and no complementing will take place or can be held High such that the output signals are inverted. The Decoder can be utilized to complement either all of the output terminals, output terminals 0 through 3, or output terminals 4 through 7, depending upon the signal levels applied to the COMPLEMENT CONTROL lines. Decoding will take place upon the application of a Enable (EN) signal and the application of the PTR binary values. IT is not deemed necessary to trace the step-by-step functioning of the illustrated circuit since this is readily apparent to those skilled in the art.

FIG. 12b is a table illustrating the selected Stack Register in response to Pointer input signals for the three-to-eight Decoder illustrated in FIG. 12a.

FIG. 12c is a Decoder Truth Table for the Decoder illustrated in FIG. 12a.

Figure 13A:
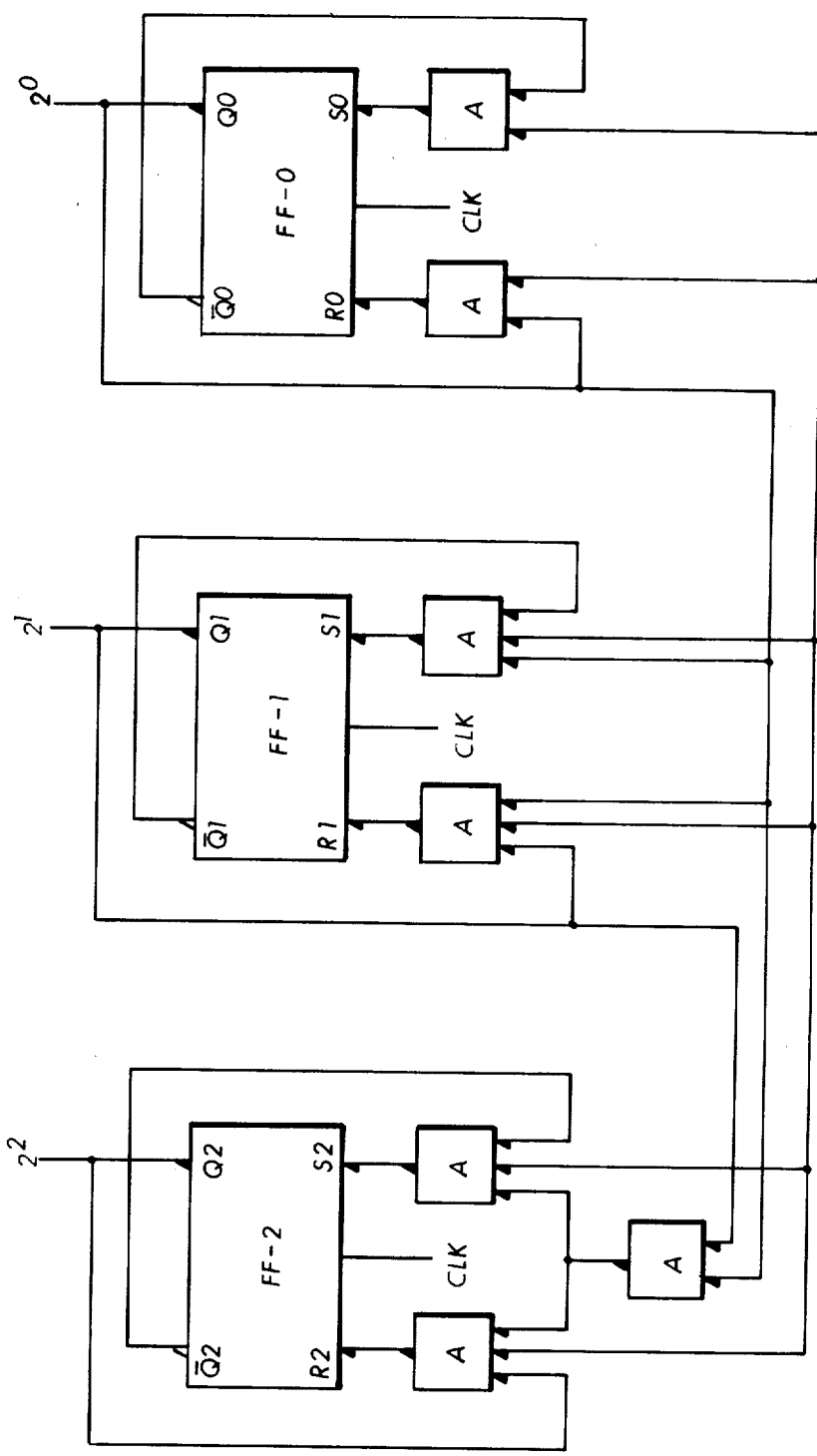
FIG. 13a is a logic block diagram of a three-stage binary counter.

FIG. 13a is a logic block diagram of a three-stage binary counter. The illustrative counter is comprised of three flip-flop circuits designated FF-0, FF-1, and FF-2, interconnected to respond to ADVANCE PULSES to provide the binary count values at output terminals $2^0$, $2^1$, and $2^2$. Such a counter can be utilized for Load PTR and for Read PTR.

FIG. 13b is a table illustrating the count output signals for the counter illustrated in FIG. 13a. The ADVANCE PULSES occur sequentially such that the 0 through 7 ADVANCE PULSES result in the Count signal combinations illustrated. When the counter has counted through the eight possible combinations, it recycles and starts over, thereby providing a circular count availability for use in driving the virtual stack addressinq circuitry.

Figure 14A:
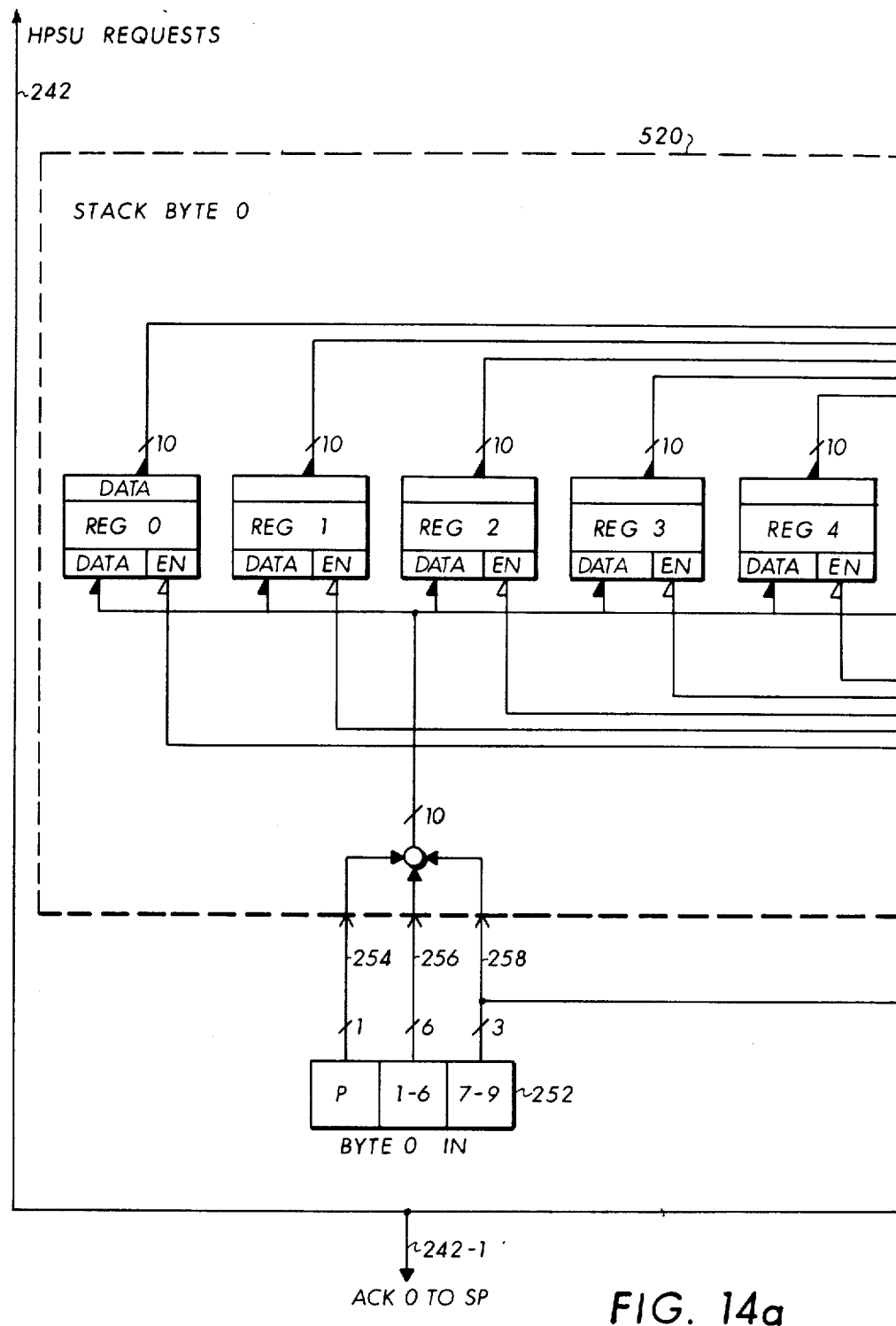
FIG. 14a through FIG. 14c, when arranged as shown in FIG. 14,is a detailed block diagram of the partially duplexed pipelined stack, including the compare stack and the comparison fields for detecting stack address decode errors.
Figure 14B:
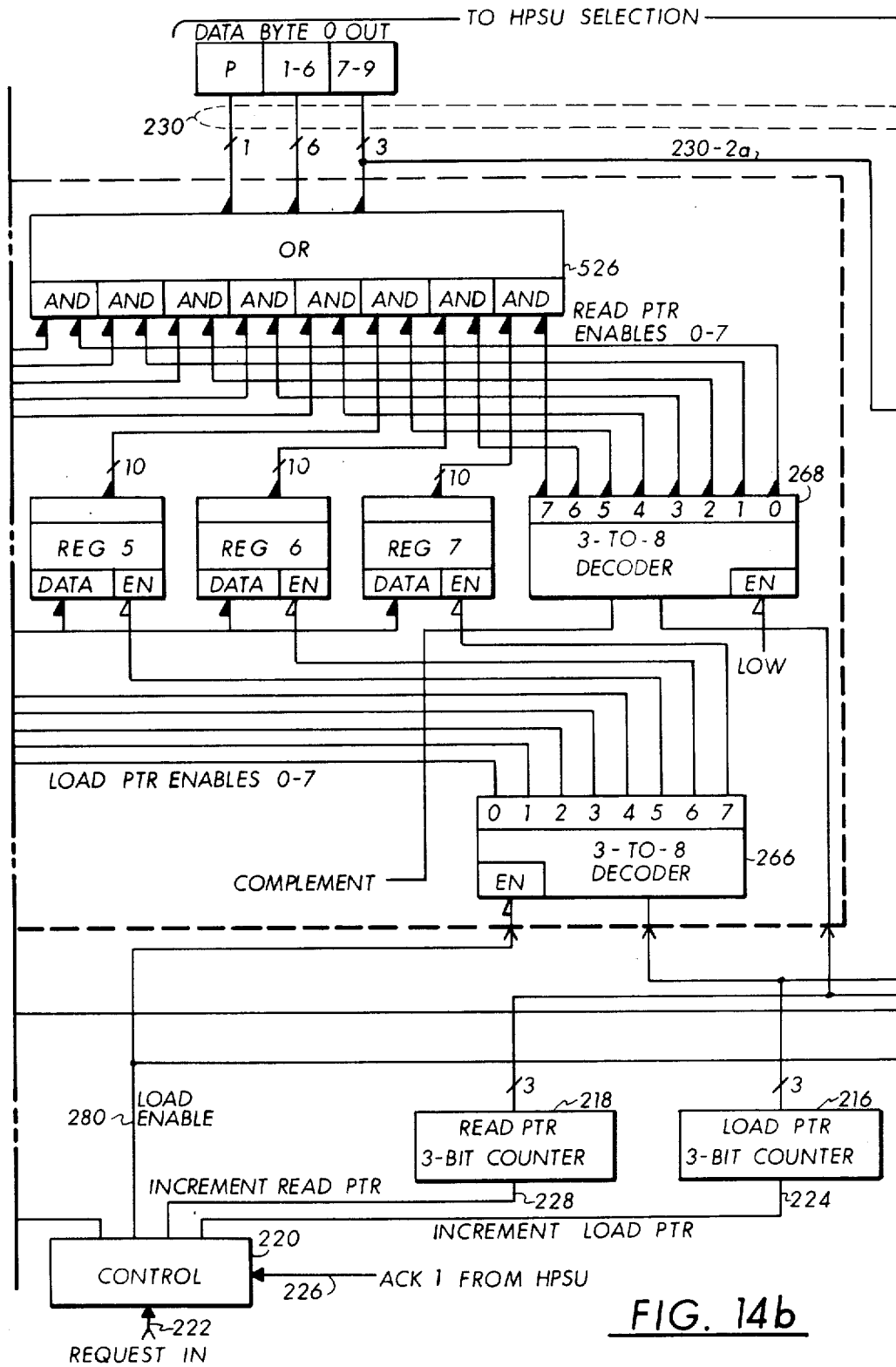
Figure 14C:
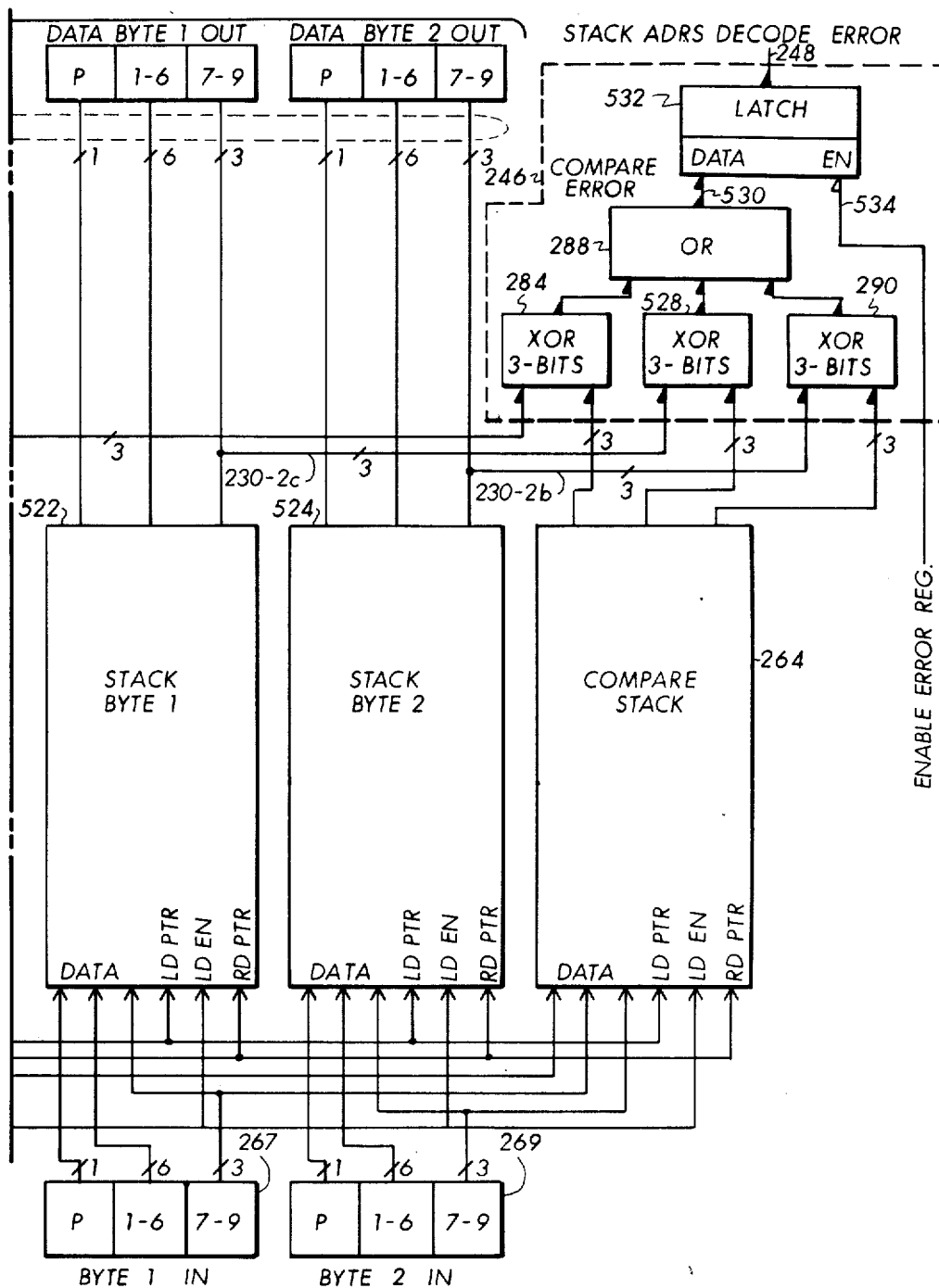

FIG. 14a through FIG. 14, when arranged as shown in FIG. 14, is a detailed block diagram of the partially duplex pipelined Stack, including the Compare Stack and the comparison fields for detecting stack address decode errors. To the extent possible for clarity, reference numerals relate back to elements discussed with respect to FIG. 5 and FIG. 6. The control signals relate to the sequences described in FIG. 7.

As illustrated, there are three parallel data stacks with Stack Byte 0 520, Stack Byte 1 522, and Stack Byte 2 524 operating with Compare Stack 264. Stack Byte 0 520 is shown in detail to include eight 10-bit registers, identified as REG 0 through REG 7, which are under control for loading by 3-to-8 Decoder 266. The data input for Stack Byte 0 520 is provided at input interface 252 where the Byte is comprised of a parity bit P, on line 254, and nine bits of data with six bits provided on lines 256 and three bits provided on line 258. The selecting of the appropriate Stack Register is under control of Decoder 266. The partial duplexing is based upon three bits from each input byte as previously described.

Control 220 responds to Request In signals on line 222 for incrementing the Load PTR on line 224, and responds to ACK 1 signals from HPSU on line 226 to increment the Read PTR 218. The Request Out signals are provided on line 242 and at the same time provide Acknowledge (ACK 0) to the SP on line 242-1.

An array of AND-OR circuits 526 functions in response to inputs received from the Registers REG 0 through REG 7, when selected by the 3-to-8 decoder 268 to provide the selected signals for Byte 0 on the appropriate lines included in cable 230.

Stack Byte 1 522 and Stack Byte 2 524 are similarly constructed. Compare Stack 264 is also similarly constructed recognizing that in the 10-bit Registers only 9-bits are actually utilized.

Output from the three data Stacks are provided at Byte 0 282-0, Byte 1 282-1, and Byte 2 282-2.

The Stack Through Check Circuits are shown enclosed in dash block 246. This through-check circuitry includes 3-bit XOR circuits 284, 290, and 528. XOR 284 is a 3-bit comparison of three bits read from Stack Byte 0 on line 230-2a with the corresponding three bits from Compare Stack 264. Similarly, XOR 290 compares three bits from Stack Byte 2 received on line 230-2b with the corresponding 3-bits stored in Compare Stack 264. Finally, XOR 528 compares the three bits received from Stack Byte 1 received on lines 230-2c with the corresponding bits from Compare Stack 264. Each of the 3-bit XOR circuits perform a bit-by-bit comparison of the associated bits, and provide error signals to OR 288 whenever comparison is not found. The Compare Error is provided on line 530 to set Latch 532 whenever an error condition is present and the Enable Error Register signal is present on line 534. When set, Latch 532 provides the STACK ADRS DECODE ERROR signal on line 248.

The foregoing description of the three Stack segment array is illustrative of the concepts of the invention. It will be recalled from above, that in the interface between the SP and HPSU in the preferred embodiment that substantially larger numbers of data bits are pipelined through the Stack. The concepts and structures described satisfy the requirements of these larger bit groupings. It is of course understood that the number of bits per byte and the number of bit segments per word will be capable of being modified readily by those skilled in the art.

Figure 15:
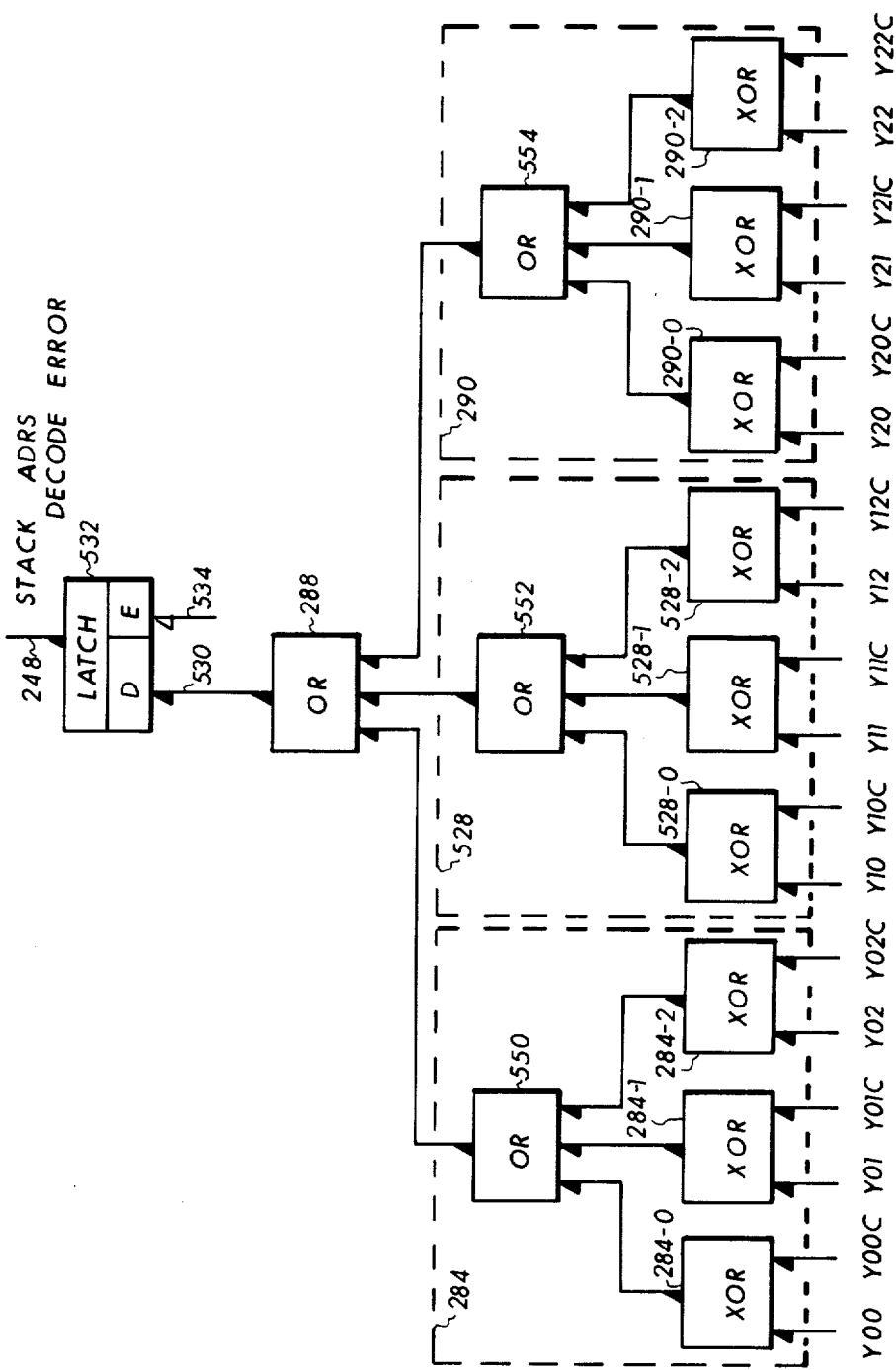
FIG. 15 is a logic block diagram of a comparison circuit for comparing three-bit partial duplex bit groupings.

FIG. 15 is a logic block diagram of a comparison circuit for comparing three-bit partial duplex bit groupings. In this logic block diagram, the 3-bit XOR comparison for the partial duplex bits for Stack Byte 0 is shown enclosed in dashed block 284. It is comprised of OR circuit 550 driven by XOR 284-0, XOR 284-1, and XOR 284-2. The input signals Y00, Y01, and Y02 represent the 3-bit segment read from the selected Register in Stack Byte 0. The signals Y00C, Y01C, and Y02C represent the corresponding 3-bit grouping read from Compare Stack 264. The 3-bit comparison for Stack Byte 1 is accomplished by the circuitry enclosed by dashed block 528 wherein OR 552 is driven by the output signals from XOR 528-0, XOR 528-1, and XOR 528-2. The input signals Y10, Y11, and Y12 represent the 3-bit signal grouping from the selected Register for Stack Byte 1, that are to be comared to Y10C, Y11C, and Y12C from the Compare Stack. Finally, the 3-bit comparison for Stack Byte 2 is shown enclosed in dashed block 290. In this circuit arrangement, OR 554 is driven by XOR 290-0, XOR 290-1, and XOR 290-2. Again, the input signals Y20, Y21, and Y22 represent the data bits read from Stack Byte 2, and which are subjected to the bit-by-bit comparison respectively to Y20C, Y21C, and Y22C.

As previously described, if any bit comparison fails, OR 288 is driven by a High signal and will provide a High signal on line 530 to the D input of Latch 532, which will set when the Enable signal is present on line 534.

In conclusion, then, it can be seen that the stated purposes and objectives of the invention have been satisfied. The partially duplexed pipelined virtual stack arrangement functions with a minimal time overhead and with acceptable additional levels of circuit components to ensure the integrity of the data passing through the pipeline in the Multiple Unit Adapter for ultimate storage in an HPSU. It is of course understood that various changes in logical circuit arrangements, circuit selection, physical structure and functionality will become apparent to those skilled in the art after having considered the teaching of applicant, all without departing from the spirit and scope of the invention. Accordingly, what is intended to be protected by Letters Patent is set forth in the claims.

We claim:

1. In a digital data processing system, an improved partially duplicated virtual pipelined stack structure wherein the stack structure is partially duplicated such that a predetermined number of bits of each data word are stored in a compare stack comprising:

a plurality of stack means each having a plurality of stack register means for temporarily storing a segment of a plurality of pipelined data words, said plurality of stack means positioned such that, taken together, the correspondingly located stack register means of each of said stack means each stores a segment of a total data word;

compare stack means having a corresponding plurality of compare stack register means, each temporarily storing predetermined selected bit grouping of each of the segments of a total data word stored in corresponding registers of said plurality of stack register means;

addressing means for said stack means and for said compare stack means for addressing corresponding ones of said pluralities of said stack register means and said compare stack register means as locations;

data input means for receiving data words to be loaded;

requested receiving means for receiving request signals indicative that data words are available at said data input receiving means;

load pointer means coupled to said stack means and to said compare stack means for providing load addressing signals indicative of the selective one of said stack register means and the corresponding one of said compare stack register means at which loading is to take place;

read pointer means coupled to said stack means and coupled to said compare stack means for providing read addressing signals at which reading is to take place;

first control means coupled to said request receiving means for causing the data word stored in said data input means to be loaded in said plurality of stack means simultaneously, each at the location indicated by said load addressing signals coupled to said addressing means from said loader pointer means, and for causing the loading of a predetermined selection bit groupings of said data word in said compare stack means at the location indicated by said load addressing signals from said load pointer means, and thereafter for causing said load pointer means to be advanced;

second control means for enabling reading of data word from said plurality of stack means simultaneously, each at the location indicated by said read addressing signals, and for enabling reading of said predetermined bit groupings of said data word stored in said compare stack means from compare stack means at the location indicated by said read addressing signals from said read pointer means, and thereafter advancing said read pointer means;

comparison means coupled to said stack means and to said compare stack means for comparing said predetermined bit groupings of said data word read from said compare stack means to corresponding bit groupings of said data word read from said plurality of data stack means for providing a first comparison signal when a first comparison condition indicative that no error condition has been detected, is detected, and for providing a second comparison signal when a second comparison condition indicative of a detected malfunction in said stack means is detected.

2. A partially duplicated stack structure as in claim 1 wherein said predetermined bit groupings of said data word are Y-bits long each, where 'Y' is a positive integer greater than one and less than the number of bits in said data segment, and wherein said comparison means includes a plurality of comparator circuit means each for making a bit-by-bit comparison of Y-bits read from said compare stack means to said like-positioned Y-bits grouping of the data segment commonly addressed by said addressing means and read from said plurality of stack means in response to said read addressing signals, said comparator circuit means including output circuit means for providing said second comparison signals when any bit pair in said bit-to-bit comparison fails to meet said first comparison condition.

3. A partically duplicated stack structure as in claim 2 wherein each of said data word is partioned in Z segments, and said plurality of stack means includes Z segment stack means, each for storing corresponding ones of said Z segments of said data words at corresponding addressed locations; and said compare stack means including further means for storing Y-bits of each of said Z segments of each of aid data words at responding addressed locations, and further including Z comparison means for comparing each set of Y-bits read from said compare stack means to commonly addressed and like-positioned groups of Y-bits commonly addressed and associated ones of said Z segments of said data words, for concurrently generating said first and second comparison signals for each comparison of Y-bits.

4. An improved virtual R deep pipelined partially duplicated stack structure having through-checking to ensure data integrity comprising:

stack means having R addressable stack register means, each for storing a data word in a pipelined stream of data words;

compare stack means having R addressable compare stack register means, each for storing predetermined bit groupings of said data word as stored in said stack means;

access means coupled to said compare stack means and to said stack means for loading said data words individually and said associated bit groupings of said data words individually at correspondingly addressed locations in each, and for reading said data words individually and said predetermined bit groupings of said data words individually from correspondingly addressed locations in each;

comparison means coupled to said stack means and to said compare stack means, for comparing said predetermined groupings of said data word read out from said compare stack means to like-positioned bit groupings of said data word read out from said stack means and for providing first and second comparison signals; and signal means coupled to said comparison means to receive said first comparison signal and provide a no-error output signal and to receive said second comparison signal signal and provide an error output signal indicative of malfunction of said access means, wherein said stack register means includes:

Z data segment stack register means, each for storing a predetermined one of Z data segments of said data word at correspondingly addressed location therein.

5. An improved virtual R deep pipelined partially duplicated stack structure as in claim 4, wherein said compare stack register means includes means for storing Y-bits bit grouping of each of said Z data segments of said data word at corresponding addressed location, where 'Y' is a positive integer greater than one and less than the number of bits in said data segment.

6. An improved virtual R deep pipelined partially duplicated stack structure as in claim 5, wherein 'Y' is a positive integer of three or greater but less than the number of bits in said data segment.

7. An improved virtual R deep pipeland partially duplicated stack structure as in claim 5 wherein said comparison means includes Z compare circuit means coupled to said Z data segment stack means and to said compare stack means, each of said Z compare circuit means for comparing a corresponding addressed location of said Y-bits long sit grouping read from said compare stack means to a like-positioned portions Y-bits long of the corresponding one of said Z data segments read from a corresponding one of said Z data segment stack means and each for providing said first and second comparison signals to said signal means.

8. An improved virtual R deep pipelined partially duplicated stack structure as in claim 7, wherein each of said Z compare circuit means includes:

Exclusive-OR circuit means for comparing each bit grouping of Y-bits read from said compare stack means on a bit-by-bit basis to each like-positioned bit grouping of Y-bits read from said Z data segment stack means and for providing corresponding ones of said first and second comparison signals.

9. An improved virtual R deep pipelined partially duplexed stack structure as in claim 8 and wherein said signal means includes input circuit means coupled to each of said Exclusive-OR circuit means, and output circuit means for providing said no-error output signals and said error output signals.

* * * * *